US007685690B2

(12) United States Patent
Ghiran

(10) Patent No.: US 7,685,690 B2
(45) Date of Patent: Mar. 30, 2010

(54) METHOD AND APPARATUS FOR ATTACHING A FASTENER NUT TO A HYDROFORMED PART

(75) Inventor: Mircea M. Ghiran, Lake Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 681 days.

(21) Appl. No.: 11/167,998

(22) Filed: Jun. 28, 2005

(65) Prior Publication Data

US 2006/0288559 A1    Dec. 28, 2006

(51) Int. Cl.
B23P 17/00 (2006.01)
(52) U.S. Cl. .......................... 29/421.1; 29/432; 228/2.3
(58) Field of Classification Search ................ 29/421.1, 29/432, 505, 515, 520; 72/55, 56, 58, 61; 83/54, 53; 228/2.1, 2.3
See application file for complete search history.

(56) References Cited

U.S. PATENT DOCUMENTS 6,305,201 B1 * 10/2001 Ghiran et al. .................. 72/55
6,442,820 B1 * 9/2002 Mason ....................... 29/421.1
6,460,750 B1 * 10/2002 Coletta et al. ................ 228/2.1
6,658,908 B1 * 12/2003 Ghiran et al. .................. 72/55
6,729,531 B2 * 5/2004 Stevenson et al. ......... 228/112.1
6,880,743 B1 * 4/2005 Coletta et al. ............. 228/112.1
6,915,672 B1 * 7/2005 Ghiran et al. .................. 72/55
6,931,901 B2 * 8/2005 Ghiran et al. .................. 72/55
2001/0038027 A1 * 11/2001 Coletta et al. ................ 228/2.3
2003/0136810 A1 * 7/2003 Stevenson et al. ......... 228/112.1
2005/0081589 A1 * 4/2005 Ghiran et al. .................. 72/55

FOREIGN PATENT DOCUMENTS

DE    19508632 A1    9/1996
JP    2004304632    * 10/2004
JP    2004328873    * 11/2004

OTHER PUBLICATIONS

Wikipedia information about "friction welding", searched Jun. 30, 2006, last modified May 8, 2006, pp. 1-4, [online: http://www.wikipedia.com].*

* cited by examiner

Primary Examiner—David P Bryant
Assistant Examiner—Christopher M Koehler

(57) ABSTRACT

Method and apparatus are disclosed wherein a hydroformed part remains in a hydroforming die cavity under hydroforming pressure while an attachable fastener nut is operated to pierce and form a collar in the part by forced insertion of the nut into the part and wherein the nut is fastened to the collar by friction welding, friction skip welding or mechanical locking depending on the form of the fastener nut.

6 Claims, 24 Drawing Sheets

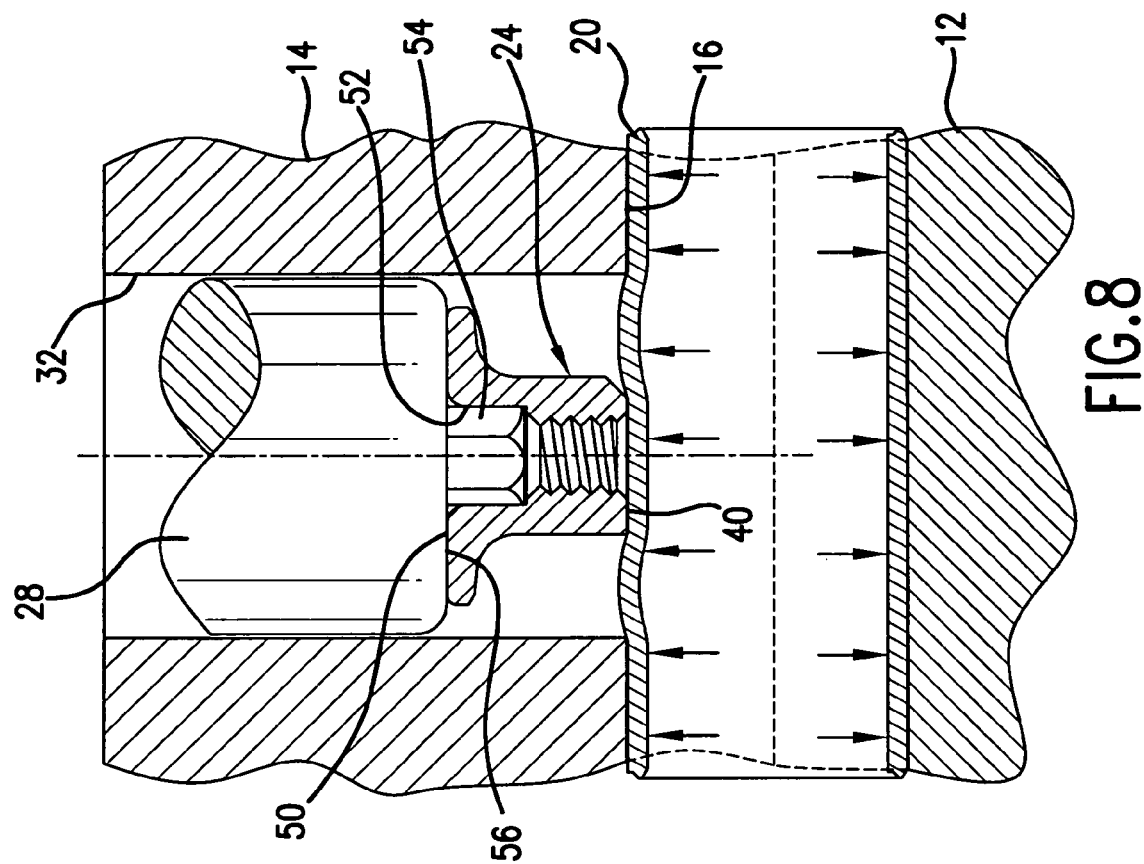
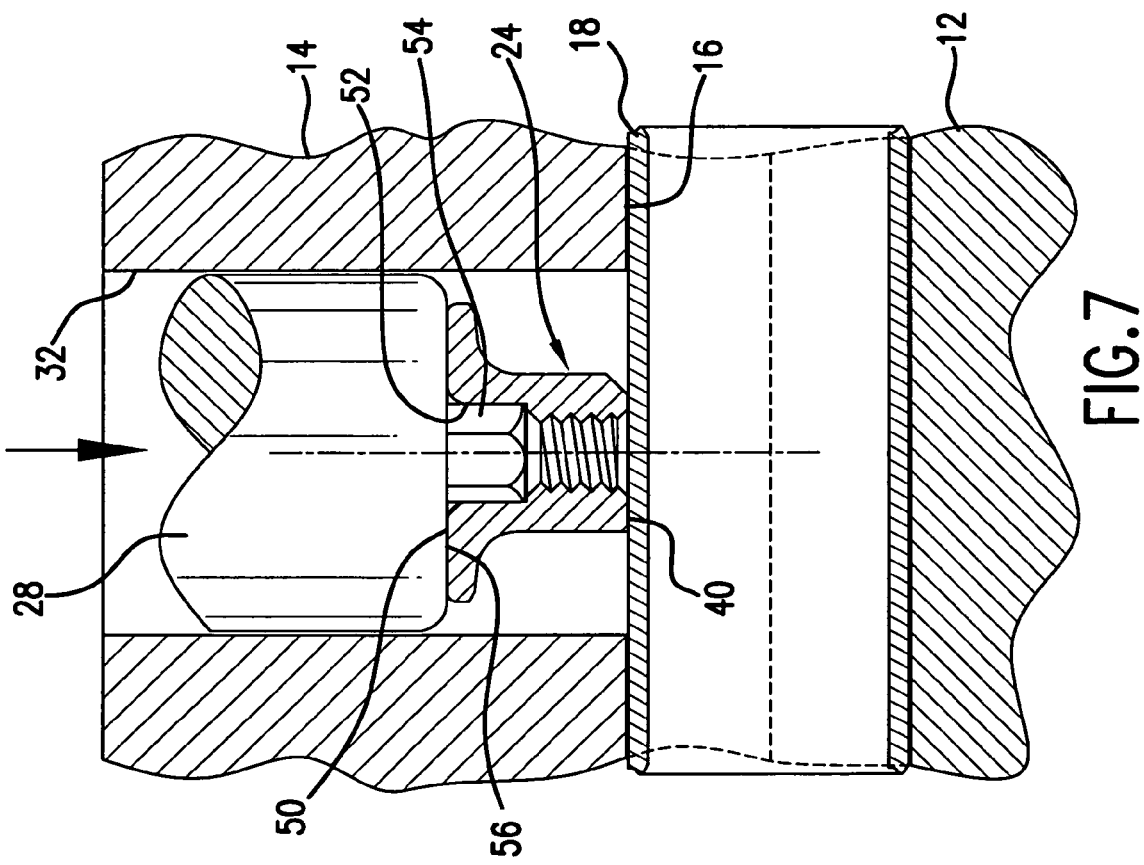

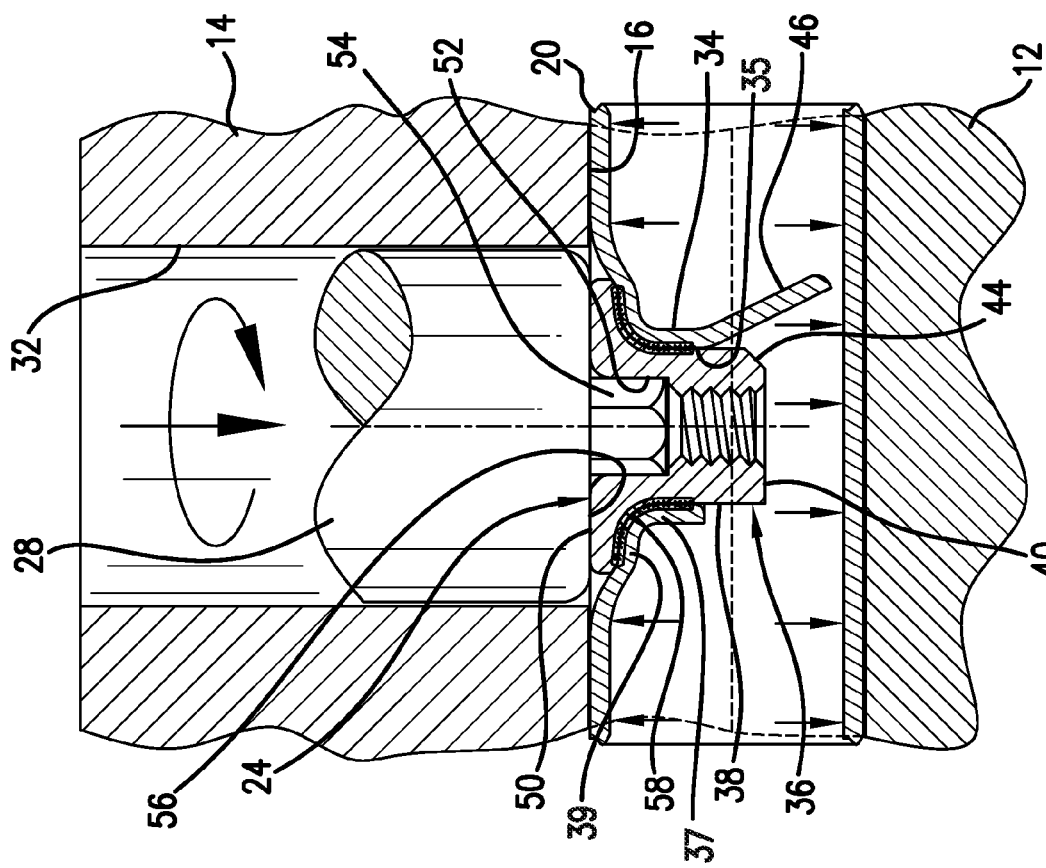
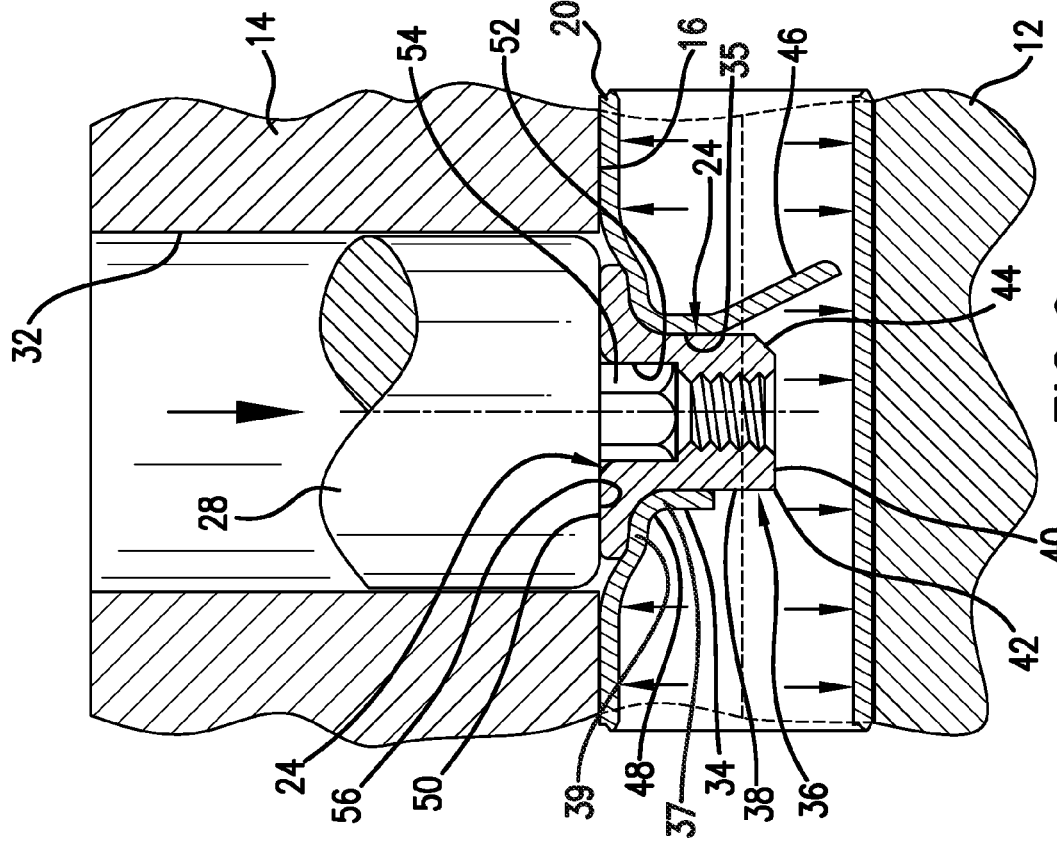

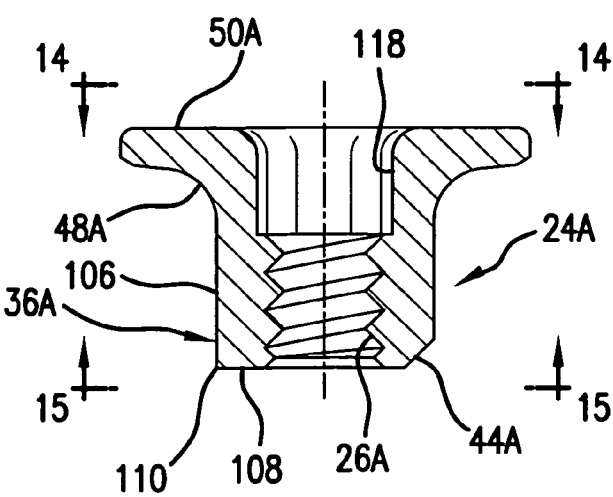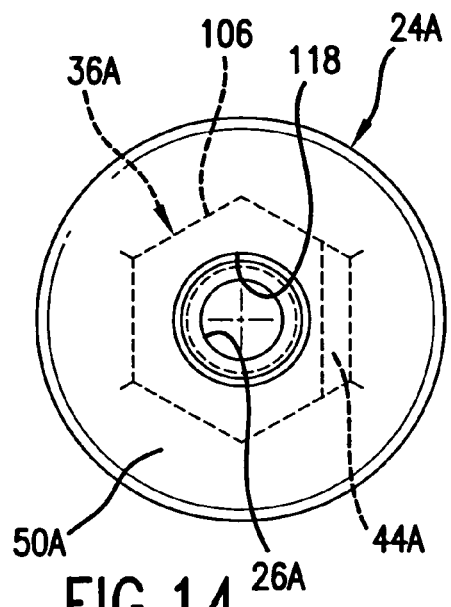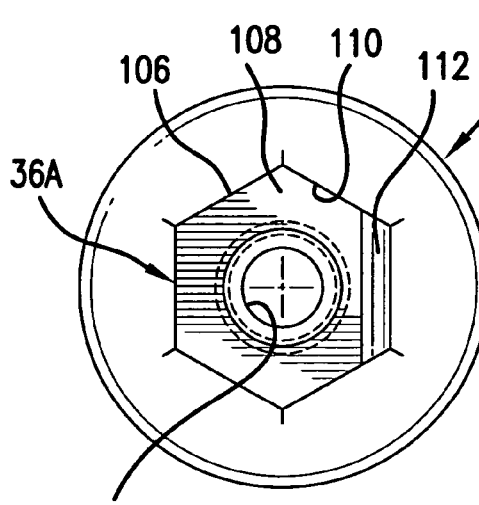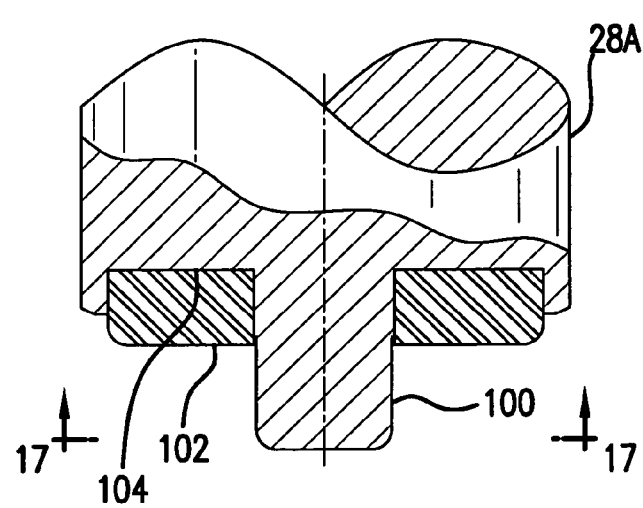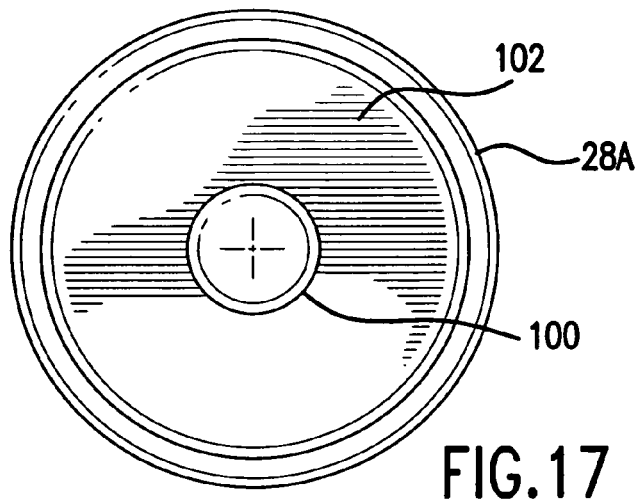

METHOD AND APPARATUS FOR
ATTACHING A FASTENER NUT TO A
HYDROFORMED PART

TECHNICAL FIELD

The present invention relates to method and apparatus for attaching a fastener nut to a hydroformed part and more particularly to method and apparatus for attaching fastener nuts of various forms to a hydroformed part.

BACKGROUND OF THE INVENTION

In the case of certain hydroformed parts, there is the requirement that one or more other components be detachably fastened thereto for the purpose of forming an assembly therewith. For example, certain hydroformed motor vehicle components such as a motor vehicle frame member. Wherein one or more other frame components are required to be firmly fastened thereto to form a frame assembly. In order to accomplish this, suitable fastening means are normally added to the hydroformed part in a secondary operation to provide for such attachment of these other components.

One well-known practice is to accomplish this by the attachment of a suitable fastener nut at the required location in a secondary operation following the removal of the hydroformed part from the hydroforming dies. Wherein a hole is formed in the part such as with a drilling, laser or water jet cutting operation at each attaching location and then locating and welding a weld-nut in place or locating and mechanically fastening a rivet-nut in place.

Another manner of obtaining a suitable means of attachment is known as hydrotapping and is disclosed in U.S. Ser. No. 10/690,100 filed Oct. 21, 2003 and entitled "Hydrotapping Unit" and assigned to the assignee of the present invention. Wherein the hydroformed part is pierced and there is then formed an inwardly projecting collar in the part, and the collar is then tapped to form an internal thread of substantial length. This is accomplished while the hydroformed part remains in the hydroforming dies and still under the hydroforming pressure that then supports the piercing and collar forming operations. As a result, this significantly reduces the time to process the part as compared with requiring a secondary operation following removal of the hydroformed part from the dies.

SUMMARY OF THE INVENTION

The present invention is a significant departure from both a secondary operation outside the hydroforming dies and also from hydrotapping the part while the part remains in the hydroforming dies. Wherein an attachable fastener nut is inserted in and fastened to the hydroformed part at the required attaching location while the part remains in the closed hydroforming dies and still under the internal hydroforming pressure. The fastener nut, in addition to providing for attachment of an assembly component with a threaded fastener such as a stud or bolt, is also utilized to support the part at the required attaching location against the force of the hydroforming pressure during the hydroforming of the part. As well as later serve as a punch in both piercing the part and forming an inwardly projecting retention collar in the hydroformed part to which the nut is then firming attached.

In accomplishing these operations, there is provided a power unit for powering an attachable nut having both an integral punch and attaching means. Wherein the power unit initially positions and holds the end of the punch portion of the nut against the part at the required attaching location during the hydroforming operation to prevent the part from rupturing outward as this location. The power unit then forces the attachable nut to pierce and form the retention collar in the part with the punch portion of the nut while the hydroforming pressure remains in the part to assist in these operations. Whereafter and with the nut thus inserted in the retention collar, the power unit operates to either weld or mechanically lock the nut to the retention collar as determined by the form of the attaching nut. Wherein and with respect to the welding operation, there is also the option of welding a flange portion of the nut to the retention collar either by friction welding or by friction stir welding.

All these operations are accomplished as a continuation of the hydroforming process in the dies which following the insertion and fastening of the nut are then opened to allow removal of the finished hydroformed part with the nut accurately and firmly fastened in place. As a result, a very strong and rigid attaching means for subsequent component attachment to the hydroformed part is quickly and completely accomplished while the hydroformed part remains in the dies and with the versatility that such attaching means can be inserted and attached at one or more required attaching locations on the part simultaneously. Moreover, nuts of different sizes can be used at different locations where the fastening requirements are different and are dependent on a particular component to be attached to the hydroformed part to form the required final assembly.

Further aspects including the areas of applicability of the present invention will become apparent from the detailed description provided hereinafter. Wherein it will be understood the detailed description and accompanying drawings, while indicating the preferred embodiments of the invention, are intended for purposes of illustrating and teaching the invention and are not intended to limit the scope of the invention.

DESCRIPTION OF THE DRAWINGS

FIGS. 6-12 are partial enlarged views taken along the line 6-6 in FIG. 1 showing the sequential operations in the process of hydroforming the part and then inserting and then friction welding the nut in FIGS. 2-4 to the hydroformed part;

FIG. 13 is a sectional view of another form of attachable fastener nut as adapted for use with the present invention;

FIG. 14 is a view taken along the line 14-14 in FIG. 13 when looking in the direction of the arrows;

FIG. 15 is a view taken along the line 15-15 in FIG. 13 when looking in the direction of the arrows;

FIG. 16 is a partial enlarged view of the power unit output shaft in FIG. 1 as adapted to operate the nut in FIG. 13;

FIG. 17 is a view taken along the line 17-17 in FIG. 16 when looking in the direction of the arrows;

DESCRIPTION OF EXEMPLARY EMBODIMENTS

Figure 1:
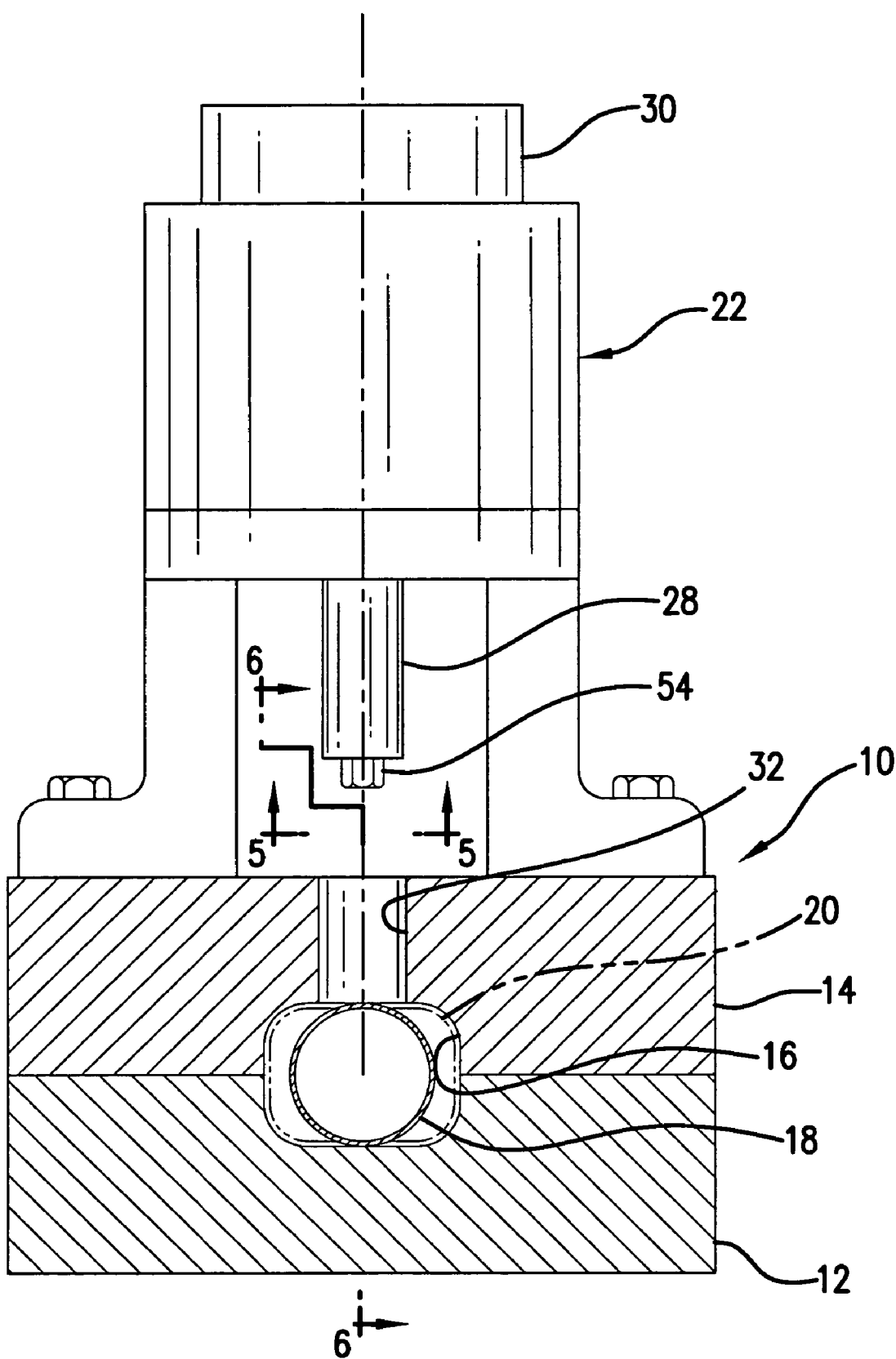
FIG. 1 is a partial cross-sectional view of hydroforming apparatus that includes a power unit for inserting and attaching a fastener nut to a hydroformed part in accordance with the present invention.

Referring to FIG. 1, there is shown a portion of a conventional hydroforming apparatus 10 comprising a lower die 12 and an upper die 14 which when closed as shown cooperatively form a die cavity 16 having a surface conforming to the shape of the part that is required and which in the illustrative example is a motor vehicle frame component. In the hydroforming process and in a conventional manner, a piece 18 of round tubular metal stock as shown in solid lines is captured between the dies in the die cavity and a hydroforming fluid typically in the form of a water-based liquid solution is then delivered through one end of the stock piece to the interior thereof while the other end is blocked. The hydroforming fluid thus delivered is pressurized and is maintained at a pressure sufficient to forcibly expand the wall of the captured piece outward against and conform to the cavity surface to thereby form a hydroformed part 20 as shown in phantom lines.

It will also be understood that following the insertion and fastening of an assembly fastening means to the hydroformed part as described hereinafter, the hydroforming fluid that remains in the part is then exhausted in a conventional manner by opening the blocked end and the dies are then opened to permit removal of the hydroformed part 20. Further details of the type of hydroforming apparatus for which the present invention is suited are, for example, disclosed in U.S. Pat. No. 5,321,964 assigned to the assignee of this invention and which is hereby incorporated by reference.

Describing now the apparatus of the present invention as incorporated in the hydroforming apparatus 10 and with reference to FIGS. 1-4, there is provided a power unit 22 for inserting an attachable fastener nut 24 in the hydroformed part 20 in the required attaching location and then firmly fastening the nut in place to the hydroformed part immediately following the hydroforming operation. Wherein the fastener nut 24 has a centrally located helical thread 26 for receiving a stud or bolt (not shown) and the power unit 22 as shown in FIG. 1 has an output shaft 28 and an electronic control module 30 that is programmed to operate the power unit to extend and retract the output shaft and also to rotate or turn the output shaft according to a prescribed schedule to effect insertion and fastening of the nut 24 to the hydroformed part 20 as described hereinafter. The power unit 22 and the electronic control module 30 are of any suitable conventional type wherein for the example the power unit may be a hydraulically operated linear/rotary output device, an electro-mechanically operated linear/rotary output device, or a combination thereof and the programmable electronic control module 30 is of a versatile machine dedicated type.

The required location of the nut 24 is in this illustrative example on the upper side of the hydroformed part 20 and for that reason the power unit 22 is rigidly fastened as shown to the upper side of the upper die 14 with its output shaft 28 directed downward and closely receivable in a cylindrical passage 32 provided in the upper die 14. Wherein the passage 32 extends through the upper die to the die cavity surface therein and is centrally aligned with the required attaching location on the upper side of the hydroformed part 20.

The nut 24 is adapted to support the wall of the hydroformed part 20 at the attaching location opposite the passage 32 during the hydroforming of the part and then immediately following the hydroforming operation and by linear forced movement by the power unit 22, pierce and form an inwardly projecting nut retention collar 34 in the part. See FIG. 9. The nut 24 is also adapted to then be friction welded to the retention collar 32 with forced rotary movement of the nut by the power unit 22 as described hereinafter.

Figure 2:
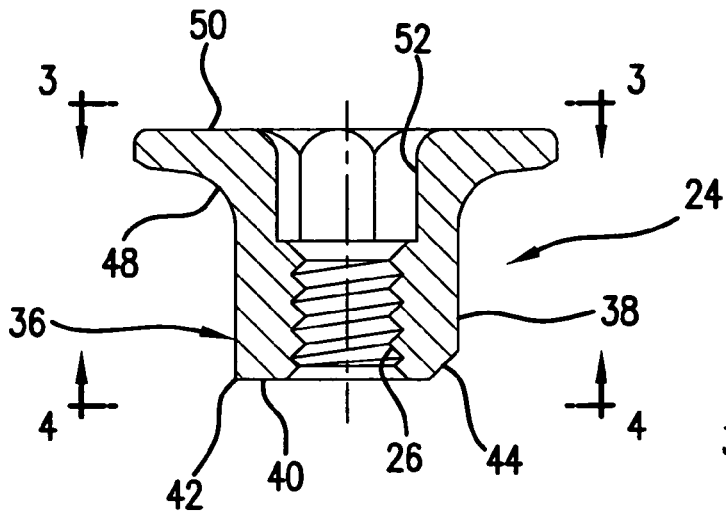
FIG. 2 is a sectional view of an attachable fastener nut as adapted for insertion and fastening by the power unit in FIG. 1.
Figure 3:
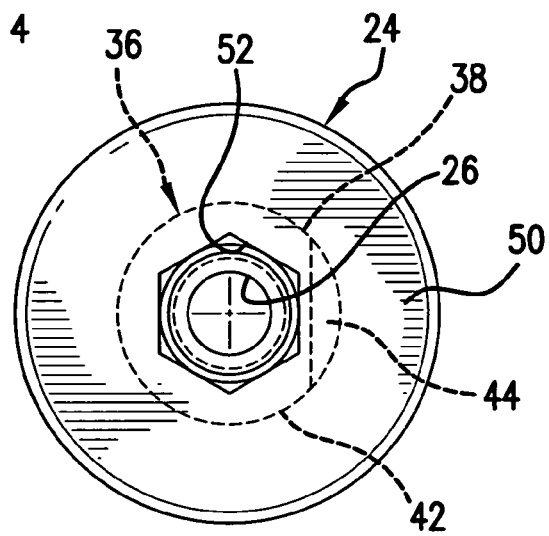
FIG. 3 is a view taken along the line 3-3 in FIG. 2 when looking in the direction of the arrows.
Figure 4:
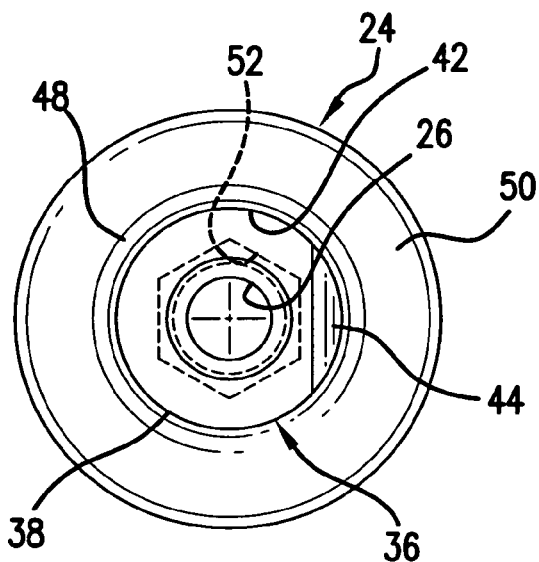
FIG. 4 is a view taken along the line 4-4 in FIG. 2 when looking in the direction of the arrows.
Figure 5:
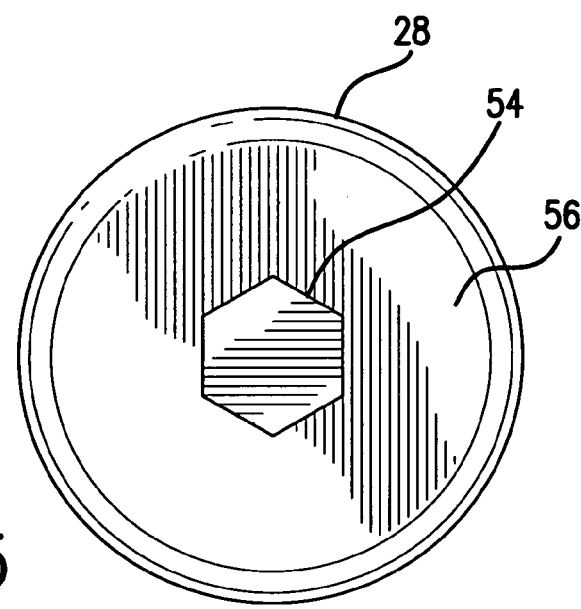
FIG. 5 is an enlarged view taken along the line 5-5 in FIG. 1 when looking in the direction of the arrows.

Referring to FIGS. 2-4, the attachable fastener nut 24 is adapted to produce the above operations with the power unit 22 by being formed at one end with an integral punch 36 through which the nut thread 26 extends. Wherein the punch 36 is defined by a circular-shaped cylindrical portion 38 having a flat end face 40 at its piercing or terminal end that is at right angles to the centerline of the nut including the cylindrical portion 38 thereof. The nut thread 26 terminates at its inner end at the punch face 40 and the annular surface area of the punch face extending about the centrally located nut thread 26 provides support in the die passage 32 for the wall of the stock piece 18 during its hydroforming at this interruption in the die cavity surface as described in more detail hereinafter and with reference to FIG. 7.

The punch face 40 has a sharp circular cutting edge 42 and a chamfer 44 where it intersects the cylindrical surface of the punch wherein the cutting edge 42 enables the punch to produce a sharp cutting action in piercing through the wall of the hydroformed part. While the chamfer 44 causes a round-shaped slug 46 that results from such piercing to remain integral with the collar 34 (see FIG. 9) while being deflected by the punch to a position clear of the hole defined by the collar as described in more detail hereinafter. In addition, the punch 36 has a fillet 48 of substantial radius at the other end of the cylindrical portion 38 of the punch where the punch joins with the remainder of the nut body to assist in the formation of the retention collar 34 in the hydroformed part as described in more detail hereinafter.

For driving the nut 24 with the power unit 22 and friction welding the fastener nut to the retention collar 34, the end of the nut opposite its punch end has an integral annular flange portion 50 that extends radially outward of the cylindrical portion 38 of the punch 36 at the fillet 48 and is adapted to be friction welded to the retention collar 34 by operation of the power unit 22. Wherein an engageable drive connection is provided between the power unit output shaft 28 and the nut 24 by a hexagonal-shaped drive socket 52 that is formed in the outer side of the flange portion 50 and receives a hexagonal-shaped end portion 54 formed on the end of the power unit output shaft 28 and by which the shaft is adapted to rotate the nut 24 for a friction welding operation as described hereinafter. With full engagement of this drive connection being determined by an annular radial shoulder 56 on the output shaft 28 abutting with the outer side of the assembly nut flange portion 50. See FIGS. 2, 3, 5 and 7. Wherein in addition to the drive end 54 and the drive socket 52 providing a drive connection between the power unit output shaft 28 and the nut 24 for the welding operation as described in detail hereinafter, the drive socket in the nut thereafter also provides access to the internal thread 26 of the nut for the attachment of a frame component to the hydroformed frame part 20 following removal of the latter from the dies with the nut welded thereto.

Figure 6:
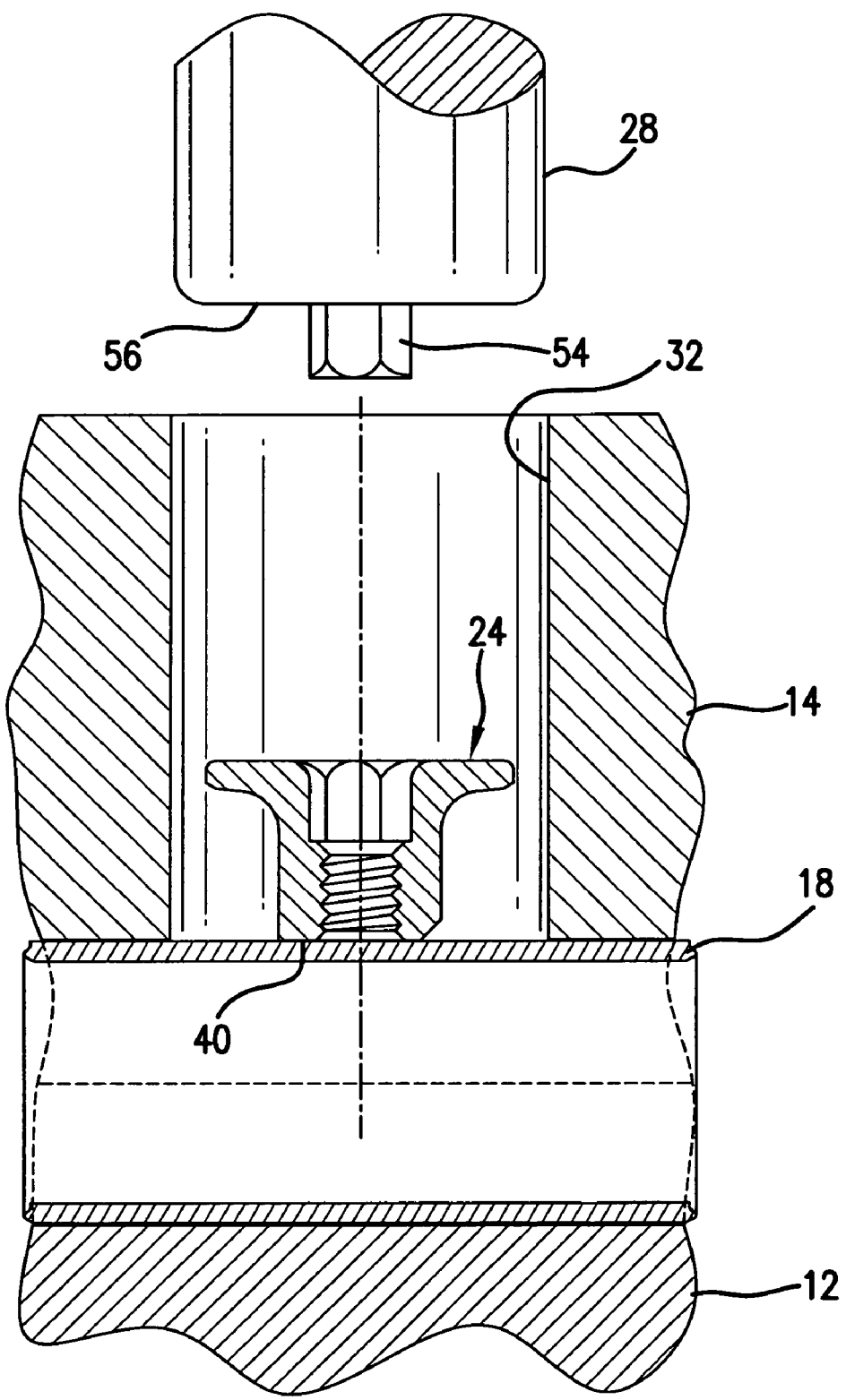

Describing now a typical sequence of operations in the insertion and fastening of the nut 24 to the hydroformed part 20 and with reference to FIGS. 1 and 6-12, the power unit 22 is operated to position the output shaft 28 by linear movement thereof so that the output shaft is initially clear of the passage 32 in the upper die 14 after the dies 12 and 14 have closed on the stock piece 18 and prior to the admission of the hydroforming fluid. See FIG. 1. The nut 24, that it will be understood has been taken from a stock of such parts, is then inserted into the passage 32 in the upper die 14 in a centered position against the stock piece 18 as shown in FIG. 6. It being further understood that this insertion and centering of the fastener nut could be accomplished with any suitable means such as a robot or other suitable nut-handling device.

With the nut 24 thus inserted and centered, the power unit 22 then extends its output shaft 28 to engage its drive end portion 54 in the nut socket 52 and hold the nut firmly in place against the stock piece 18 with the output shaft shoulder 56 as shown in FIG. 7. As an alternative way to accomplishing such insertion and centering of the nut 24, it will also be understood that the nut can be received at its socket 52 on the power unit output shaft end portion 54 while the output shaft is fully retracted and then temporarily held thereon with a suitable sticky substance such as grease while the output shaft is extended (lowered) to position and hold the nut against the stock piece 18.

With the nut 24 thus held firmly in place against the stock piece 18, the hydroforming fluid is then delivered under pressure to the interior of the stock piece to form the piece against the die cavity surface resulting in the hydroformed part 20 as shown in FIG. 8. The pressure necessary to effect the hydroforming operation is typically in the range of 10,000-20,000 psi for tubular steel motor vehicle frame applications and the punch face 40 of the nut 24 supports the wall of the part within the passage 32 against the large hydraulic force that is generated to prevent outward rupturing of the part that could otherwise occur at the interruption in the die cavity surface 16 by the passage 32.

Immediately following the hydroforming of the part 20 to the required shape and while the hydroforming pressure is maintained therein, the power unit 22 further extends its output shaft 28 in a linear direction forcing the punch portion 36 of the nut to pierce a round hole 35 in the part with the cutting edge 42 while the slug 46, that results remains integral with the wall of the part as a result of the chamfer 44, is deflected to a position clear of the hole 35 by the trailing cylindrical portion 38 of the punch. See FIG. 9. The hydroforming pressure provides internal support of the wall of the part in an annular region immediately outward of the passage 32 to enable such piercing and also inward wall forming action about the pierced hole by the cylindrical punch portion 38 including the fillet 48 and the flange 50 whereby there is formed the retention collar 34 defining the round hole 35 of substantial depth in the part and having the shape shown following the initial piercing operation and as the nut proceeds into the part. As seen in the drawing, FIG. 9, the shape of the retention collar 34 defining the round hole 35 includes an axial extending sleeve portion 37 that is formed by the cylindrical punch portion 38 and a depressed wall portion 39 of the tube 20 that is formed by the flange 50. Furthermore, as seen in FIG. 9, the output shaft 28 progresses in the linear direction to depress the tube wall at the depressed wall portion 39 to such an extent that the flange 50 assumes a flush fit with the outer surface of the tube 20. Wherein the shoulder 56 of the shaft 28 by its engagement with the outer end of the nut 24 prevents fluid in the part from escaping out through the threaded hole in the nut during the piercing operation and subsequent collar forming operation. While the nut by its contact with the part prevents fluid in the part from escaping outward around the nut during the piercing operation and subsequent collar forming operation and wherein the flange 50 of the nut at the end of the collar forming operation is then forcibly held in surface-to-surface sealing contact with the retention collar 34 in an annular region 58 extending about the collar and the nut flange.

The power unit 22, while continuing to forcibly hold the flange 50 of the nut 24 in sealing engagement against the retention collar 34 in the annular region 58, then rotates the output shaft 28 causing the nut and thus the flange 50 of the nut to rotate with respect to the stationary retention collar 34 as shown in FIG. 10. With this operation occurring either with the hydroforming fluid in the part exhausted or while the hydroforming pressure is maintained in the part to assure sufficient support of the retention collar 34 against the continuing force of the output shaft 28 acting on the nut flange 50 in pressing the latter against the retention collar 34. The combination of sufficient contact pressure of the nut flange 50 against the retention collar 34 in the region 58 applied by the output shaft 28 and sufficient rotational speed of the nut causes friction at the contact region 58 and results in a heat buildup therein sufficient to form a strong friction weld permanently joining the nut to the retention collar in the annular region 58. At which point the power unit operation is immediately ceased by its control system.

Regarding the friction welding parameters and as is well know in the friction welding art, the contact pressure and relative rotational speed necessary to accomplish the weld will depend on the particular application. With the necessary contact pressure and rotation speed necessary to obtain a satisfactory friction weld typically determined for a particular application by trial and error. For example and with respect to this exemplary embodiment in the particular environment and wherein fluid is or is not present in the hydroformed part, the nut can be rotated at a speed such as 2000 rpm and the contact pressure necessary to produce satisfactory friction welding then determined by simply increasing the contact pressure with the power unit until the desired weld is obtained.

Figure 11:
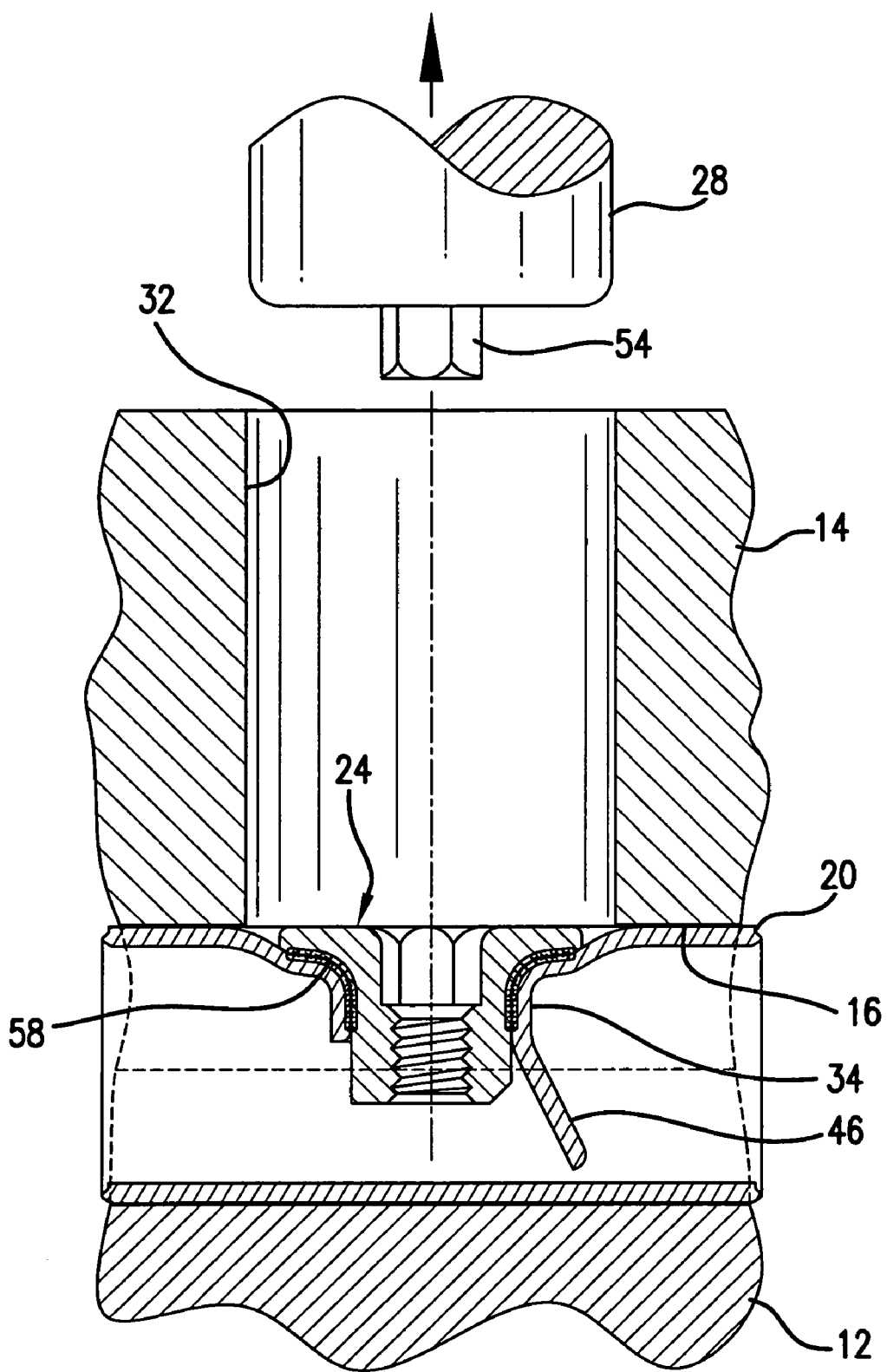
Figure 12:
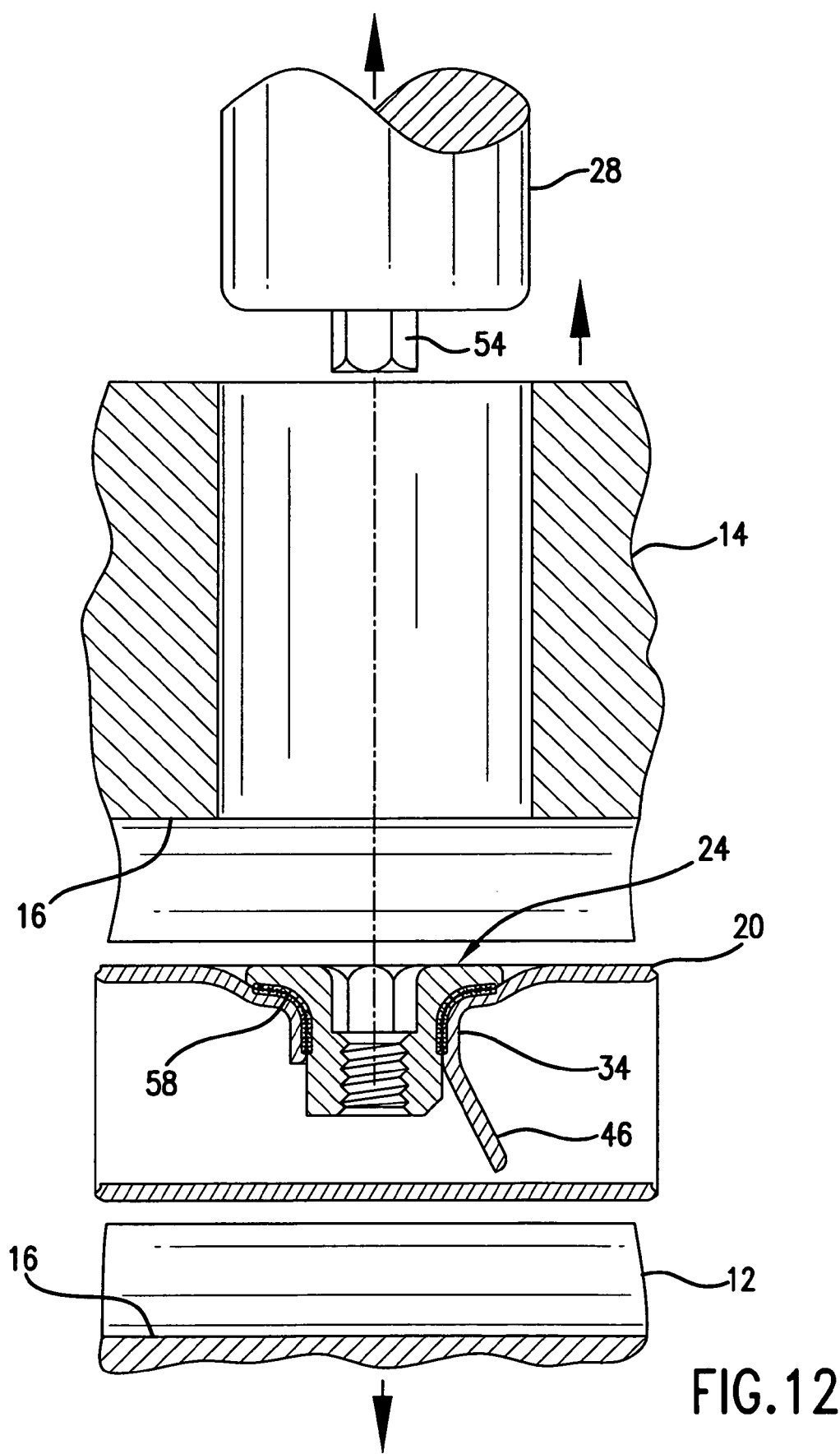
Figure 18:
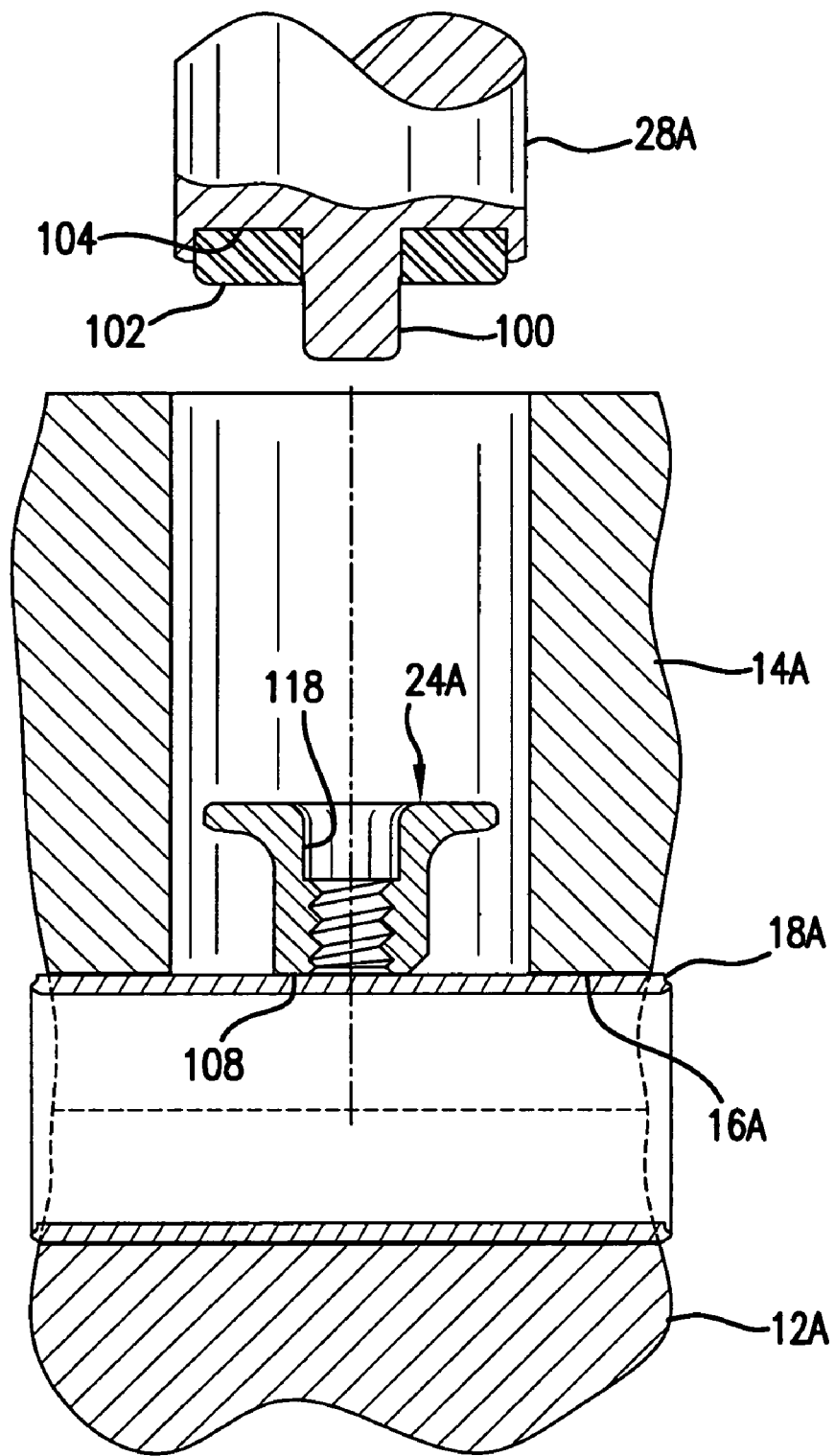
FIGS. 18-24 are views similar to FIGS. 6-12, respectively, but showing the processing of the fastener nut in FIGS. 13-15.

Following the friction welding of the nut 24 to the hydroformed part 20 and referring to FIG. 11, the power unit 22 then retracts the output shaft 28 with linear movement to disengage the output shaft drive end 54 from the nut socket 52 while the hydroforming fluid is exhausted from the part if it has not been already. The dies 12 and 14 are then opened as shown in FIG. 12 to permit removal of the hydroformed part such as with a robot and in preparation for the processing of another stock pierce including the hydroforming thereof followed by the insertion and fastening of a like nut and all in a like manner. Wherein the power unit output shaft 28 in preparation for such is returned to its starting position shown in FIG. 1 following the closing of the dies 12 and 14 on the next piece of tubular stock that is to be processed.

Referring now to the embodiment of the invention shown in FIGS. 13-24 that employs friction stir welding to firmly fasten an attachable nut in place following its insertion in the hydroformed part, parts and features corresponding to those in FIGS. 1-12 are identified by the same reference numbers but with the suffix letter "A" added and significantly different parts and features are identified with reference numbers in a 100 numbering series.

In the FIGS. 13-24 embodiment and as adapted for friction stir welding, the nut 24A whose details are shown in FIGS. 13-15 is not driven by the power unit output shaft 28A and instead the power unit output shaft as shown in FIGS. 16 and 17 now has a round-shaped end portion 100 of smaller diameter and carries an annular disk 102. Wherein the disk 102 is formed of ceramic or other rigid heat insulating material and is received by the shaft end portion 100 and at its rear side in an axially facing annular recess or pocket 104 in a radial shoulder on the shaft where it is fixed in place with a suitable heat resistant adhesive.

The nut 24A is like nut 24 in FIGS. 2-4 in having an integral punch 36A with a nut thread 26A and a fillet 48A where the punch joins with an integral flange 50A. Except that the punch 36A now has a non-circular hexagonal-shaped cylindrical portion 106, an end face 108 with a hexagonal outline, and a hexagonal cutting edge 110 that is interrupted by a chamfer 112. With the result that there is now formed a hexagonal-shaped collar 114 in the hydroformed part 20A by the punch 36A whereby the nut 24A, by the engagement between the non-circular hex shape of the cylindrical portion 106 of the nut 24A within the mating non-circular shape of a hole 135 formed in the collar 114, is prevented from rotating on its insertion in the hydroformed part 20A and there is now produced a hexagonal-shaped slug 116 from the piecing operation that remains integral with the collar 114. See FIG. 21.

In addition and for the purpose of implementing friction skip welding in the process of fastening the nut 24A in place following its insertion in a hydroformed part, the nut 24A is now provided with a round-shaped socket 118 in its flange 50A for receiving the round-shaped end 100 of the power unit output shaft 28A while leaving access to the internal thread 26A in the punch portion of the nut 24A after the fastening of the latter to the hydroformed part 20A. Thus there is no rotary drive connection between the power unit output shaft 28A and the nut 24A during the friction skip welding operation as described in detail hereinafter and wherein the nut socket 118 then serves to pilot the working end of the output shaft during such welding operation in addition to providing later access to the nut thread 26A.

Figure 19:
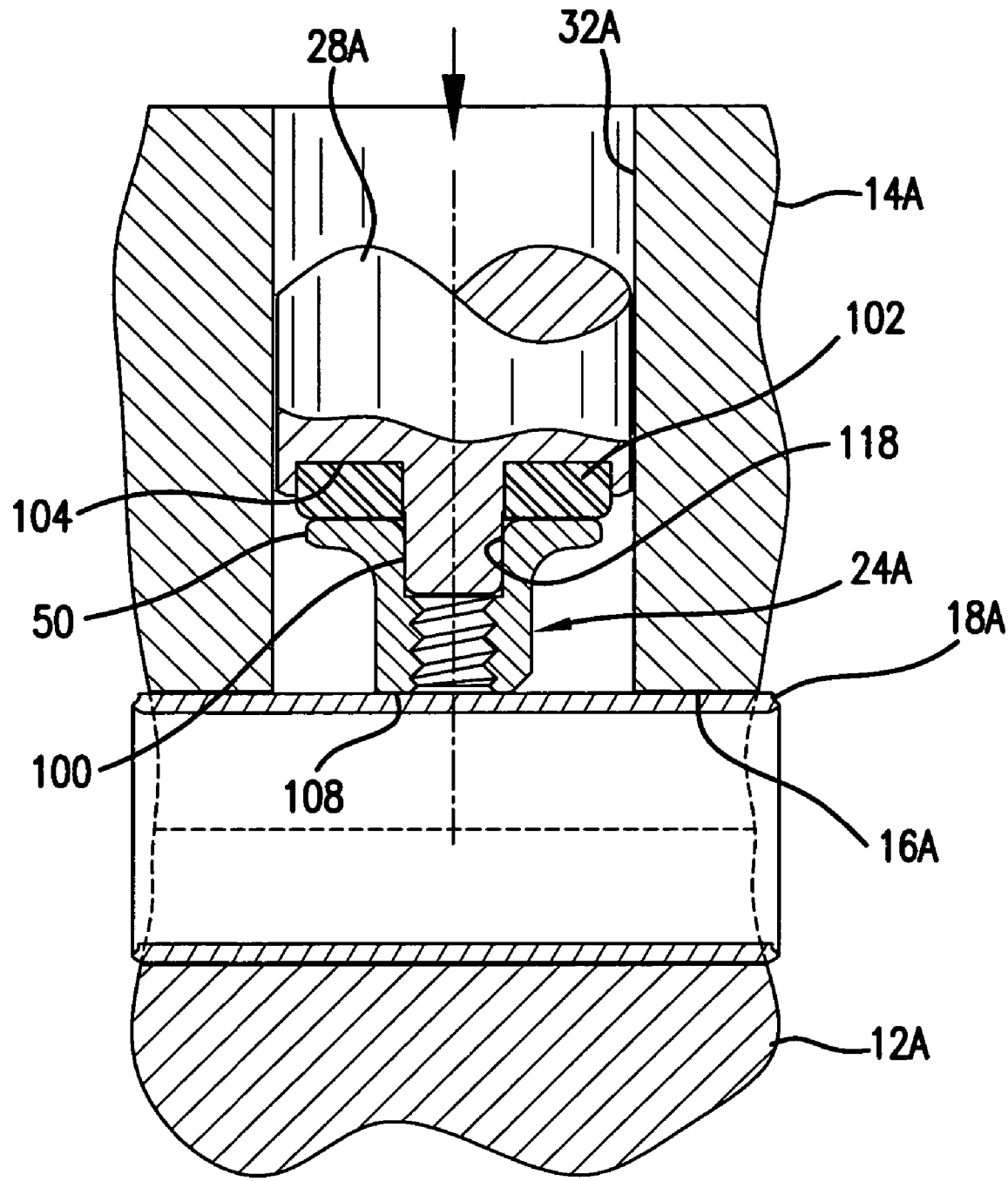

Describing now a typical sequence of operations in the insertion and fastening of the nut 24A to the hydroformed part 20A and with reference to FIGS. 18-24, the power unit is operated like in the previous embodiment to position the power unit output shaft 28A so that it is clear of the upper die passage 32A after the dies 12A and 14A have closed on a stock piece 18A and prior to the admission of the hydroforming fluid. See FIG. 18. The nut 24A is then inserted like in the previous embodiment into the upper die passage 32A and held against the stock pierce 18A by the power unit output shaft 28A. Wherein the round end portion 100 of the output shaft is received in the round socket 118 of the nut 24A and the rigid heat insulating disk 102 on the output shaft 28A bears directly against the annular flange 50A of the nut 24A to hold the nut firmly in place as shown in FIG. 19. Like previously described and as alternative way to accomplishing such insertion and centering of the nut 24A, it will also be understood that the nut 24A can be received at its round socket 52A on the output shaft end 100 while the output shaft 28A is fully retracted and temporarily held thereon with a suitable sticky substance such as grease while the output shaft is extended (lowered) to position and hold the nut 24A against the stock piece 18A.

Figure 20:
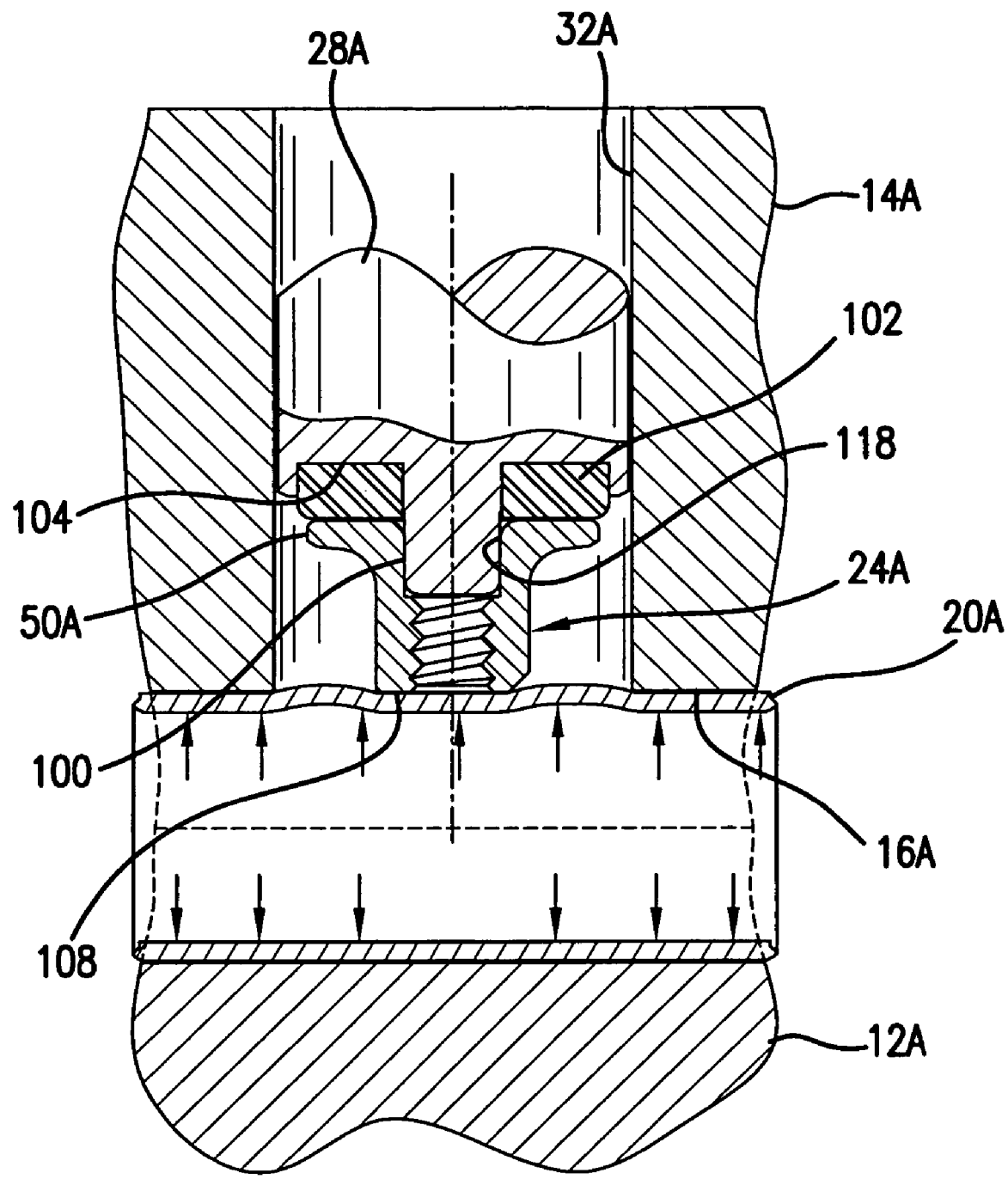

With the nut 24A thus held firmly in place, the hydroforming fluid is then delivered under pressure to the interior of the stock piece 18A to form the piece against the die cavity surface to the required shape resulting in the hydroformed part 20A as shown in FIG. 20. Wherein the hexagonal-shaped punch face 108, like the round-shaped flat punch face 36 as previously described, supports the wall of the part within upper die passage 32A against the large hydraulic force that is generated to prevent outward rupturing of the part that could otherwise occur at this interruption in the die cavity surface.

Figure 21:
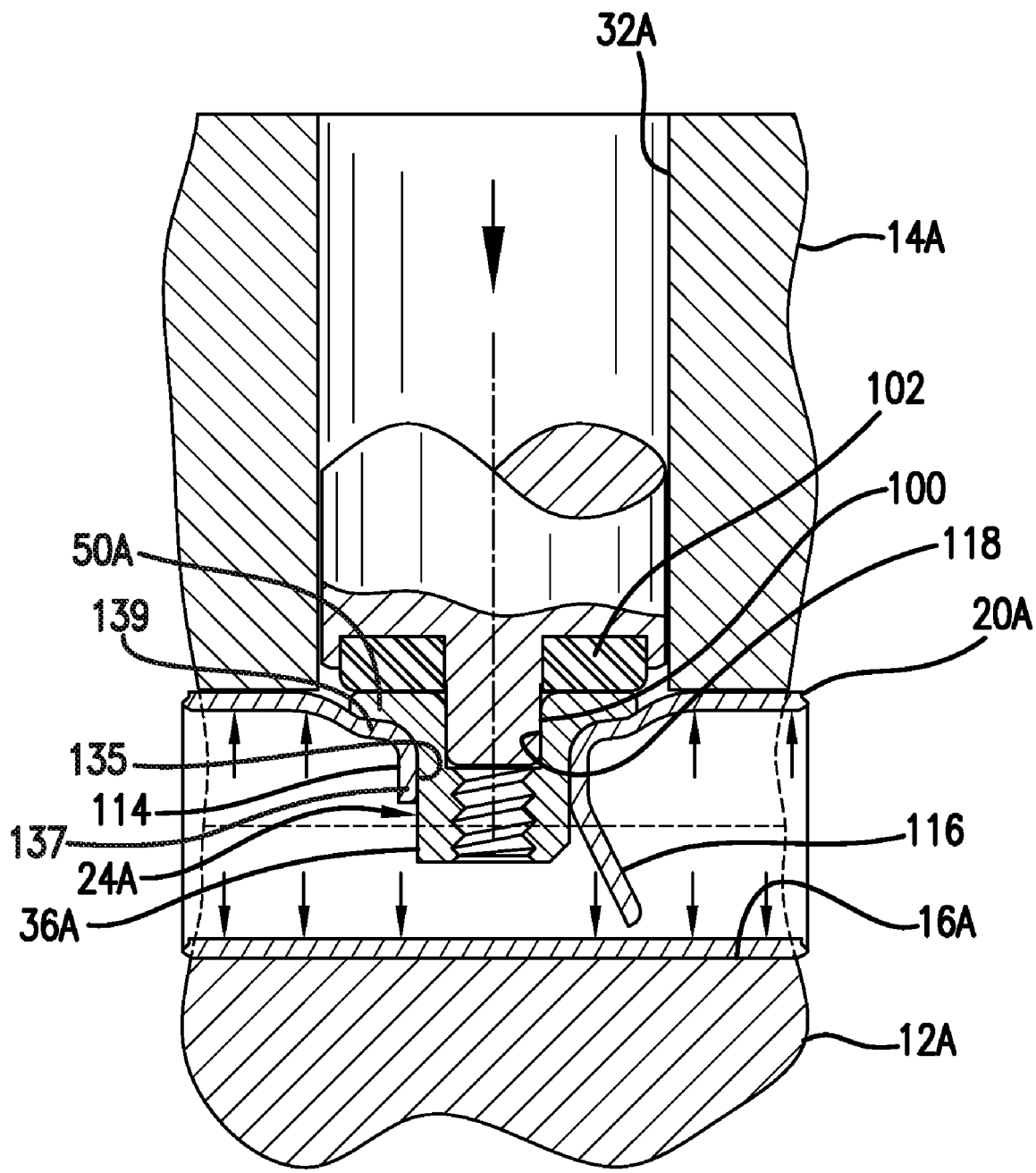
Figure 22:
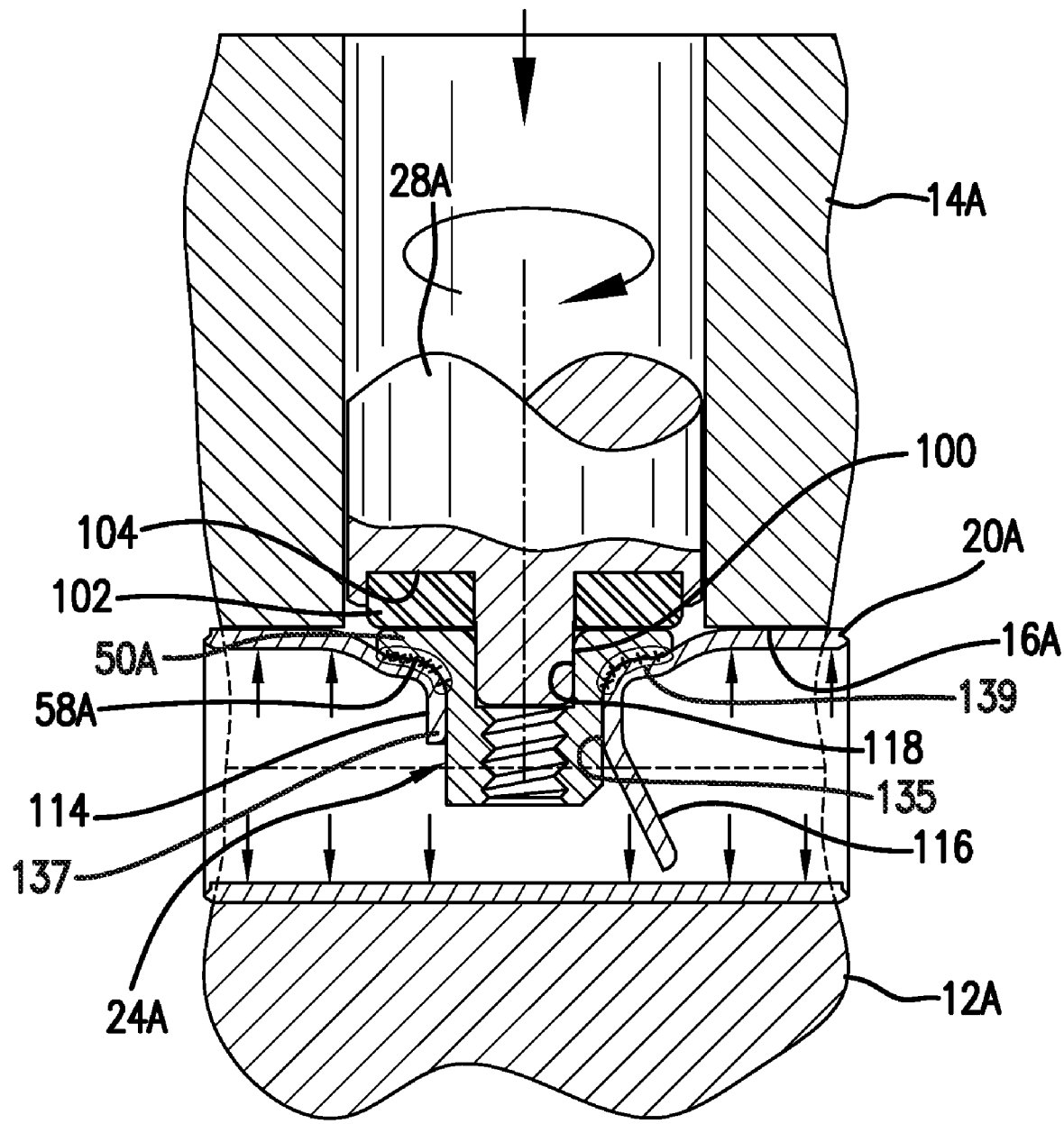

Immediately following the hydroforming of the part 20A to the required shape and while the hydroforming pressure is maintained therein, the power unit further extends its output shaft 28A forcing the punch 36A of nut 24A to pierce a hexagonal-shaped hole 135 in the part with the cutting edge 110 and wherein the resulting hexagonal-shaped slug 116 remains integral with the wall of the part and is deflected out of the way by the trailing hexagonal-shaped cylindrical portion 106 of the punch. See FIG. 21. As seen in FIG. 21, the shape of the retention collar 114 defining the hexagonal-shaped hole 135 includes an axial extending sleeve portion 137 that is formed by the hexagonal-shaped cylindrical portion 106 of nut 24A and a depressed wall portion 139 of the tube 20 that is formed by the flange 50A of the nut 14A. Furthermore, as seen in FIG. 9, the output shaft 28A progresses in the linear direction to depress the tube wall at the depressed wall portion 139 to such an extent that the flange 50A assumes a flush fit with the outer surface of the tube 20. Wherein in this case the disk 102 on the end of the shaft 28A by its engagement with the outer end of the nut 24A prevents fluid in the part from escaping out through the threaded hole in the nut during the piercing operation and subsequent collar forming operation. While the nut 24A by its contact with the part prevents liquid in the part from escaping outward around the nut during the piercing operation and subsequent collar forming operation and wherein the flange 50A of the nut at the end of the collar forming operation is then forcibly held in surface-to-surface sealing contact with the retention collar 114 in an annular region 58A extending about the collar and the nut flange.

Like in the previous embodiment, the hydroforming pressure provides internal support of the wall of the part in an annular region immediately outward of the upper die passage 32A to enable such piercing and also inward wall forming action about the pierced hole by the hexagonal-shaped punch 36A and then the trailing fillet 48A and flange 50A of the nut 24A. Whereby there is formed the hexagonal-shaped retention collar 114 that prevents rotation of the nut 24A while the flange portion 50A of the nut is forcibly held in surface-to-surface contact with the retention collar 114 in the annular region 58A by the rigid heat insulating disk 102 on the output shaft 28A.

The power unit, while continuing to forcibly hold the flange 50A of the nut 24A against the retention collar 114 in the region 58A, then rotates the output shaft 28A causing the disk 102 to rotate with respect to the then stationary flange 50A of the nut while the disk is held in forced contact therewith by the output shaft. See FIG. 22. With this occurring like in the previous embodiment wherein the hydroforming fluid in the part is then either exhausted or the hydroforming fluid pressure in the part is maintained in the part to assure sufficient support of the retention collar 114 against the continuing force of the output shaft 28A acting on the nut flange 50A in pressing the latter against the retention collar 114. The combination of sufficient contact pressure of the disk 102 against the stationary nut flange portion 50A and sufficient rotational speed of the disk 102 causes a heat buildup in the contact region 58A that effects a friction stir weld permanently joining the nut 24A to the retention collar 114 in this region of their contact. At which point the power unit operation is immediately ceased by its control system.

As is well known in the art of welding, friction stir welding is actually not a true welding process and instead is a solid-state joining process that is a combination of extruding and forging and occurs below the melting point of the work piece material. However, friction stir welding does have certain well known advantages over friction welding and it was found that it, like friction welding as described in the previous embodiment, was also suitable for use in efficiently fastening an adaptive attachable nut to the hydroformed part while the part remained in the dies with the hydroforming fluid still contained therein. Wherein the welding parameters for the friction stir welding like those for true friction welding are determined for example by trial and error and possibly based on previous experience with a similar application.

Figure 23:
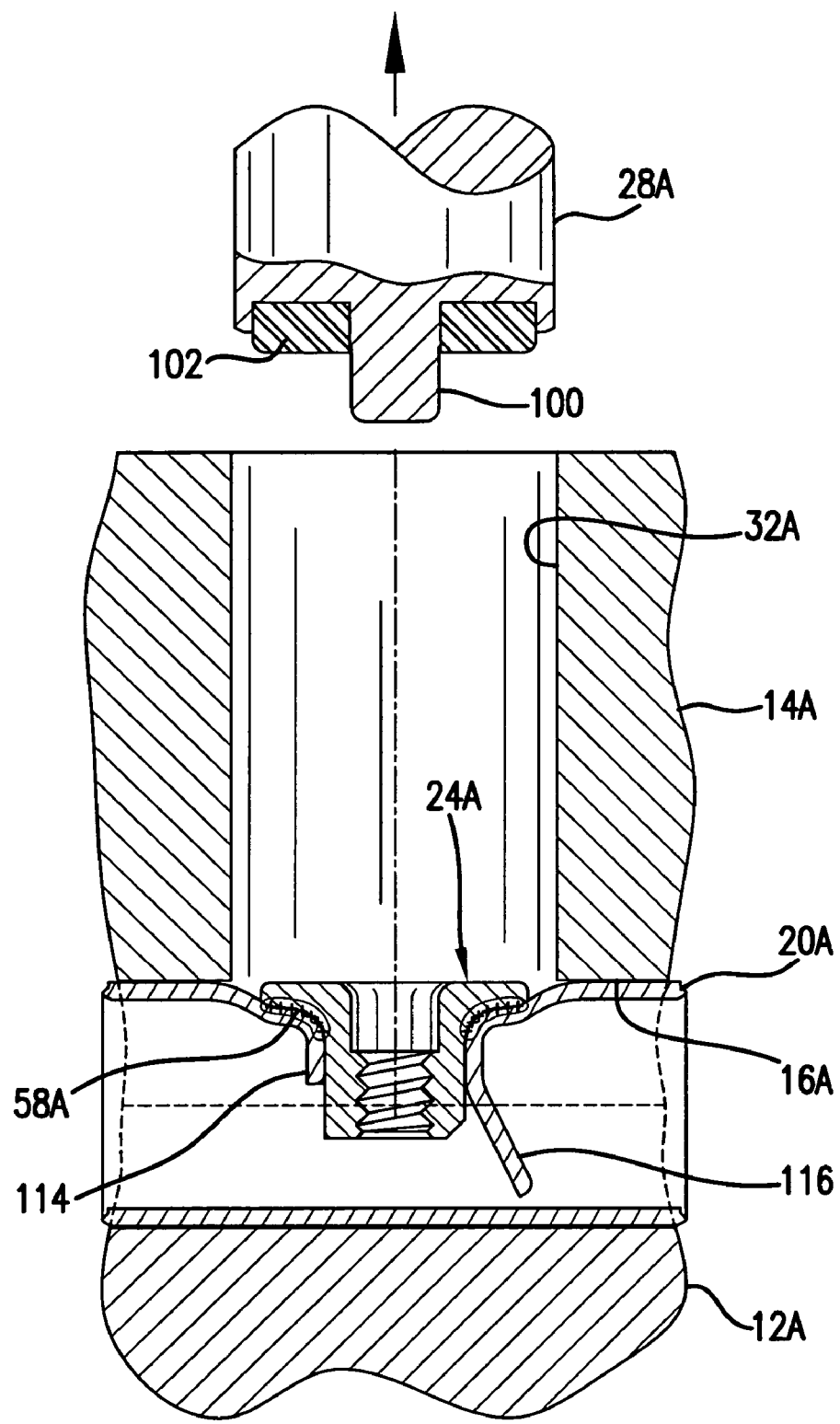
Figure 24:
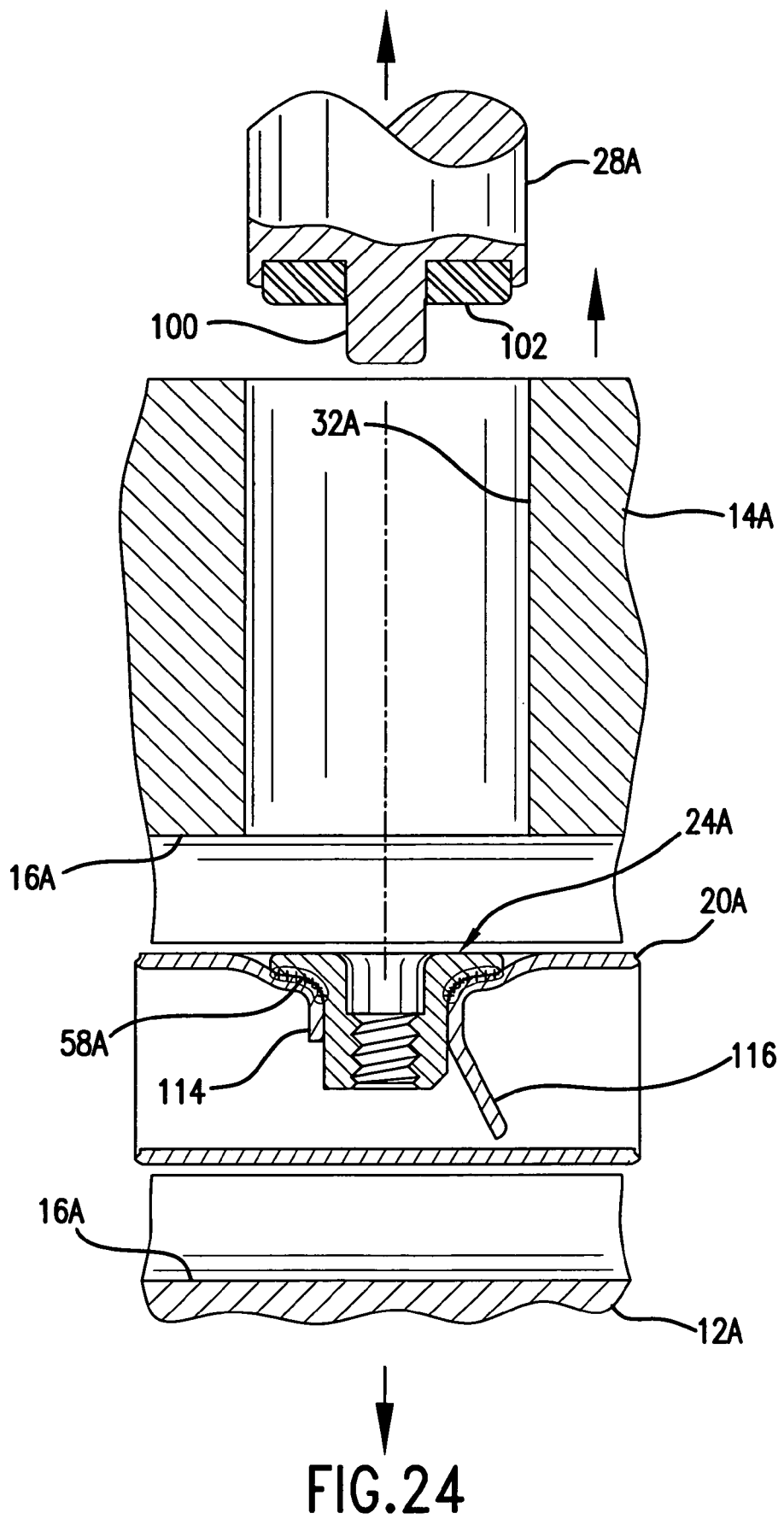

Following the friction stir welding of the nut 24A to the hydroformed part 20A and referring to FIG. 23, the power unit then retracts the output shaft 28A with linear movement to remove the output shaft end 100 from the nut socket 118 while the hydroforming fluid is exhausted from the part if it has not been already. With the hydroformed part exhausted of fluid, the dies 12A and 14A are then opened as shown in FIG. 24 to permit removal of the hydroformed part in preparation for the insertion of another stock pierce in the dies and commencement of another like nut insertion and fastening process with respect to this fresh piece. Wherein the power unit output shaft 28A is returned to its starting position shown in FIG. 18 following the closing of the dies 12A and 14A on the next piece of tubular stock that is to be hydroformed and have a nut like 24A then inserted through the upper die passage 32A and held against this stock piece during the hydroforming thereof and then inserted into and fastened by friction stir welding to this piece immediately following its hydroforming.

Referring now to the embodiment of the invention shown in FIGS. 25-42 that employs mechanical locking to fasten a mechanically lockable fastener nut to the hydroformed part following insertion of the nut in the hydroformed part, parts and features corresponding to those in FIGS. 1-24 are identified by the same reference numbers but with the suffix letter "B" added and significantly different parts and features are identified with reference numbers in a 200 numbering series.

In the FIGS. 25-42 embodiment and as adapted for insertion and fastening of a mechanically lockable fastener nut 24B, the output shaft 28A of the power unit 22B has a square-shaped end portion 54B that is the functional equivalent of the hexagonal-shaped end portion 54 in the FIGS. 1-12 embodiment in providing a drive connection to the nut 24B. The fastener nut 24B in this example is formed of two pieces. Namely, (1) a nut body 200 that is adapted to be powered by the power unit output shaft 28B in piercing and forming a hexagonal-shaped retention collar 114B in the hydroformed part like in the FIGS. 13-25 embodiment, and (2) a locking ring 202 that is received in an annular recessed portion 204 of the nut body. Wherein the locking ring 202 is adapted to provide locking of the nut body 200 and thereby the nut 24B including the locking ring to the hydroformed part 20B on partial turning of the nut body relative to the locking ring as described in more detail hereinafter.

Describing the nut body 200 in further detail and with reference to FIGS. 25-30, 38 and 42, the nut body 200 has an integral punch 36B at one end and a square-shaped drive socket 52B at the other end for receiving the square-shaped drive end 54B of the output shaft 28B. Wherein the punch 36B is defined by a hexagonal-shaped cylindrical portion 106B, end face 108B and cutting edge 110B with a chamfer 112B and is like the punch 36A previously described but wherein the punch 36B has significantly less axial length than the punch 36A. With the axial length of the punch 36B determined so that the punch after piercing and forming a hexagonal-shaped retention collar in the hydroformed part and on further entry into the hydroformed part is positioned free of the retention collar to allow the nut body to then be turned to effect locking of the nut 24B. See FIG. 38.

Figure 26:
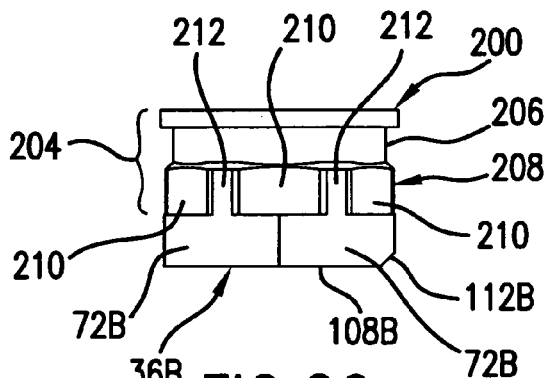
FIG. 26 is a side view of the nut body in FIG. 25.
Figure 29:
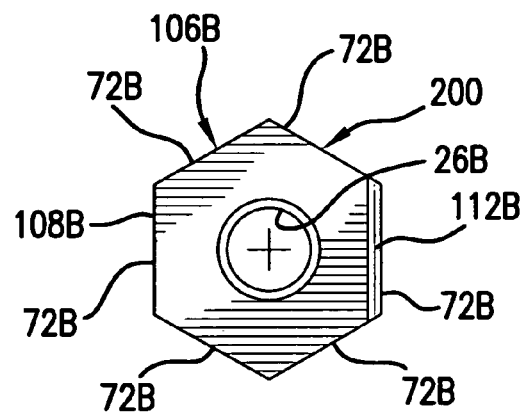
FIG. 29 is view taken along the line 29-29 in FIG. 27 when looking in the direction of the arrows.
Figure 27:
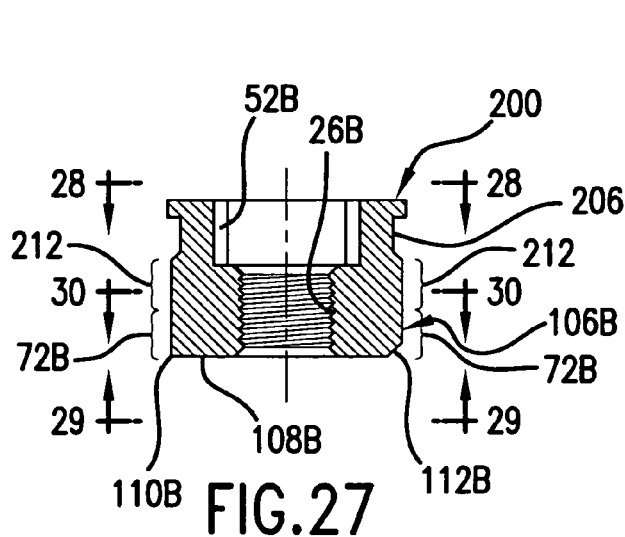
FIG. 27 is a sectional view of the nut body in FIG. 25.
Figure 30:
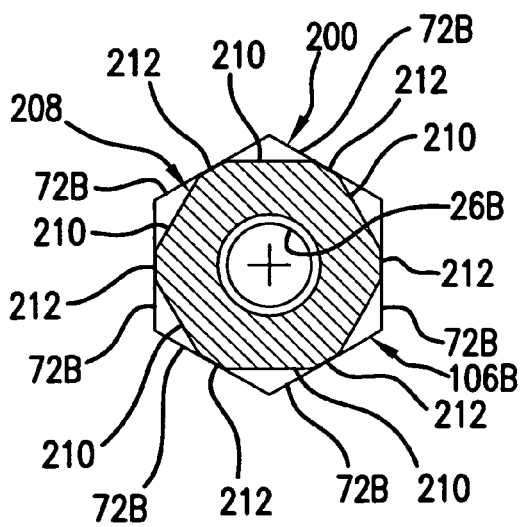
FIG. 30 is a view taken along the line 30-30 in FIG. 27 when looking in the direction of the arrows.
Figure 31:
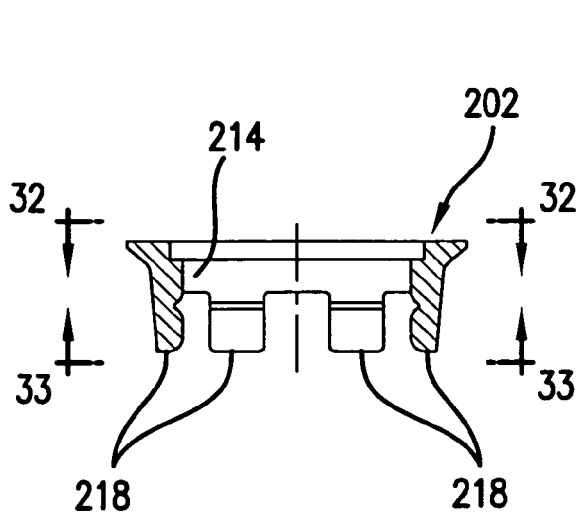
FIG. 31 is a sectional view of the locking ring in FIG. 25.
Figure 33:
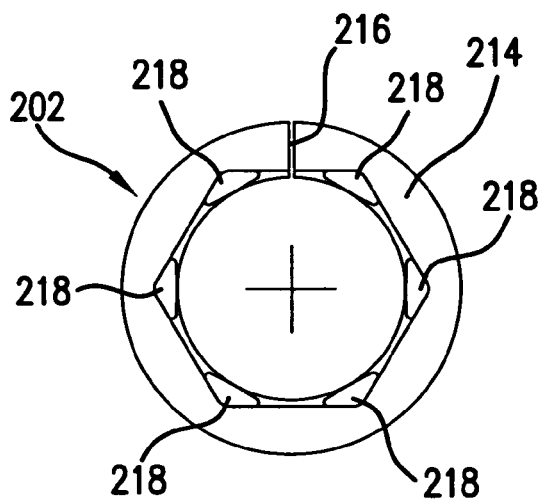
FIG. 33 is a view taken along the line 33-33 in FIG. 31 when looking in the directions of the arrows.
Figure 32:
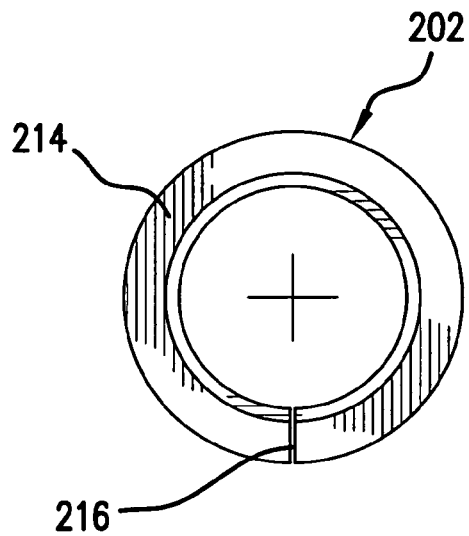
FIG. 32 is a view taken along the line 32-32 in FIG. 31 when looking in the direction of the arrows.

In providing for such locking action with the locking ring 202, the recessed portion 204 of the nut body is formed by an annular groove 206 and an adjoining cam 208 wherein the cam is located adjacent the punch portion 36B of the nut body and the annular groove is located adjacent the other end of the nut body. The cam 208 has a dodecagon-cylindrical shape (12-sided polygon cylindrical-shape) comprising six flat ramp surfaces 210 of equal size and six flat crests 212 of equal size that are located intermediate of and intersect with the respective ramp surfaces. The crests 212 are flush with the sides 72B of the punch 36B and have a peripheral or length dimension substantially less than that of the ramps as seen in FIG. 30 and a width dimension measured axially the same as the ramps as seen in FIG. 26.

Describing the locking ring 202 in further detail and with reference to FIGS. 25 and 31-34, the locking ring has an annular or ring-shaped body 214 with a split 216 that enables the locking ring to be radially expanded for reception on the nut body and then snap in to place in the recessed portion 204 of the nut body. The ring body 214 has a plurality of integral fingers 218 that depend in an axial direction from the ring body and are equally angularly spaced from and extend parallel to each other. With the number of fingers 218 corresponding to the number of flat sides 72B of the punch portion 36B of the nut body 200 and the corresponding equal number of ramp surfaces 210 of the nut body and there thus being a total of six such fingers in this illustrative example.

Figure 25:
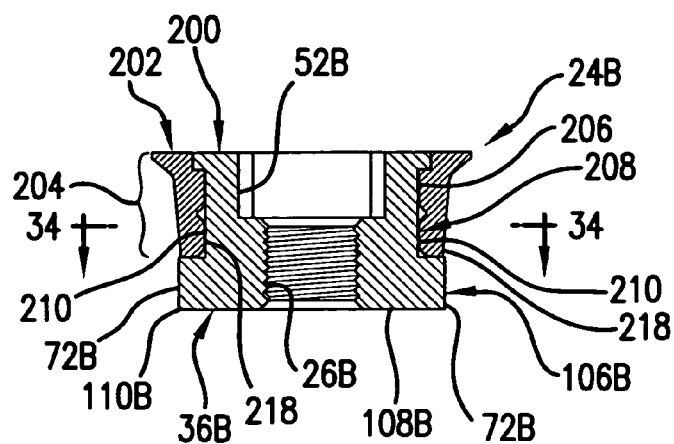
FIG. 25 is a sectional view of another form of attachable fastener nut as adapted for use with the present invention and wherein the nut comprises a nut body and a locking ring.
Figure 28:
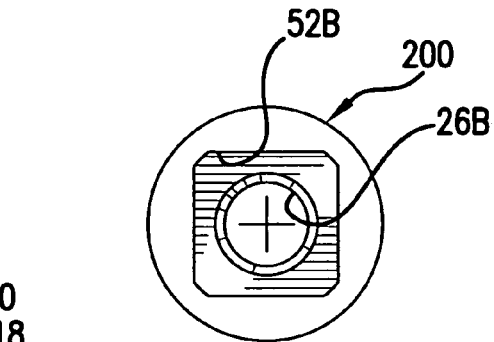
FIG. 28 is a view taken along the line 28-28 in FIG. 27 when looking in the direction of the arrows.
Figure 34:
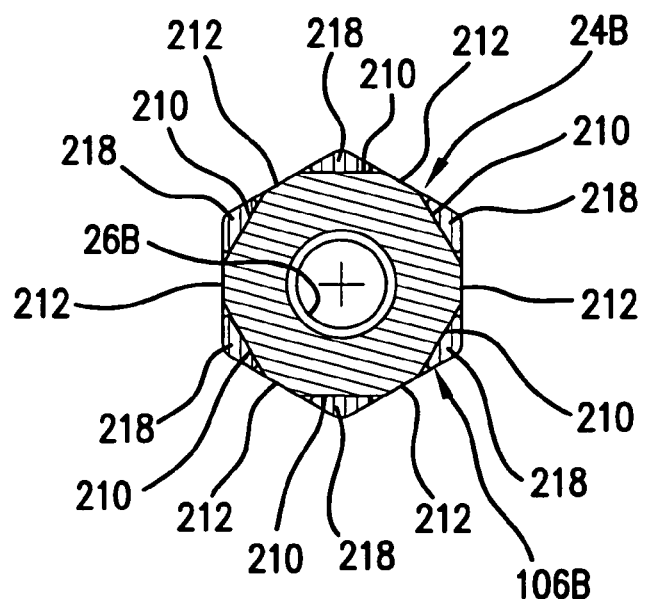
FIG. 34 is a view taken along the line 34-34 in FIG. 25 when looking in the direction of the arrows.

The locking ring 202 is received in the recessed portion 204 of the nut body 200 with the ring body 214 received against the bottom of the annular groove 206 and the fingers 218 initially received against the respective ramp surfaces 210 of the adjoining cam 208 where they are positioned between the flat crests 212 of the cam which constitute the high sides thereof. The fingers 218 have a generally triangular-shaped cross section (see FIG. 34) and the dodecagon-shaped cam 208 which is a part of the nut body is angularly indexed relative to the hexagonal-shaped punch portion 36B through an angle of 30 degrees (360 degrees divided by twice the number of fingers) and as a result the outer sides of the fingers 218 are initially positioned on the ramp surfaces 210 in positions level with the sides 72B of the punch 36B and form in effect aligned extensions thereof as seen in FIGS. 25 and 34. Whereby the fingers 218 are initially positioned to proceed into the hexagonal-shaped retention collar 114B formed by the punch 36B and then after the punch has been extended further inwardly and past the retention collar, the fingers 218 by their engagement with the retention collar prevent the locking ring 202 from turning. While the nut body 200 is then free to turn and on only partial turning thereof relative to the locking ring 202 effects locking of the nut 24B to the collar 114B by operation of the cam 208 as described in more detail hereinafter.

Figure 35:
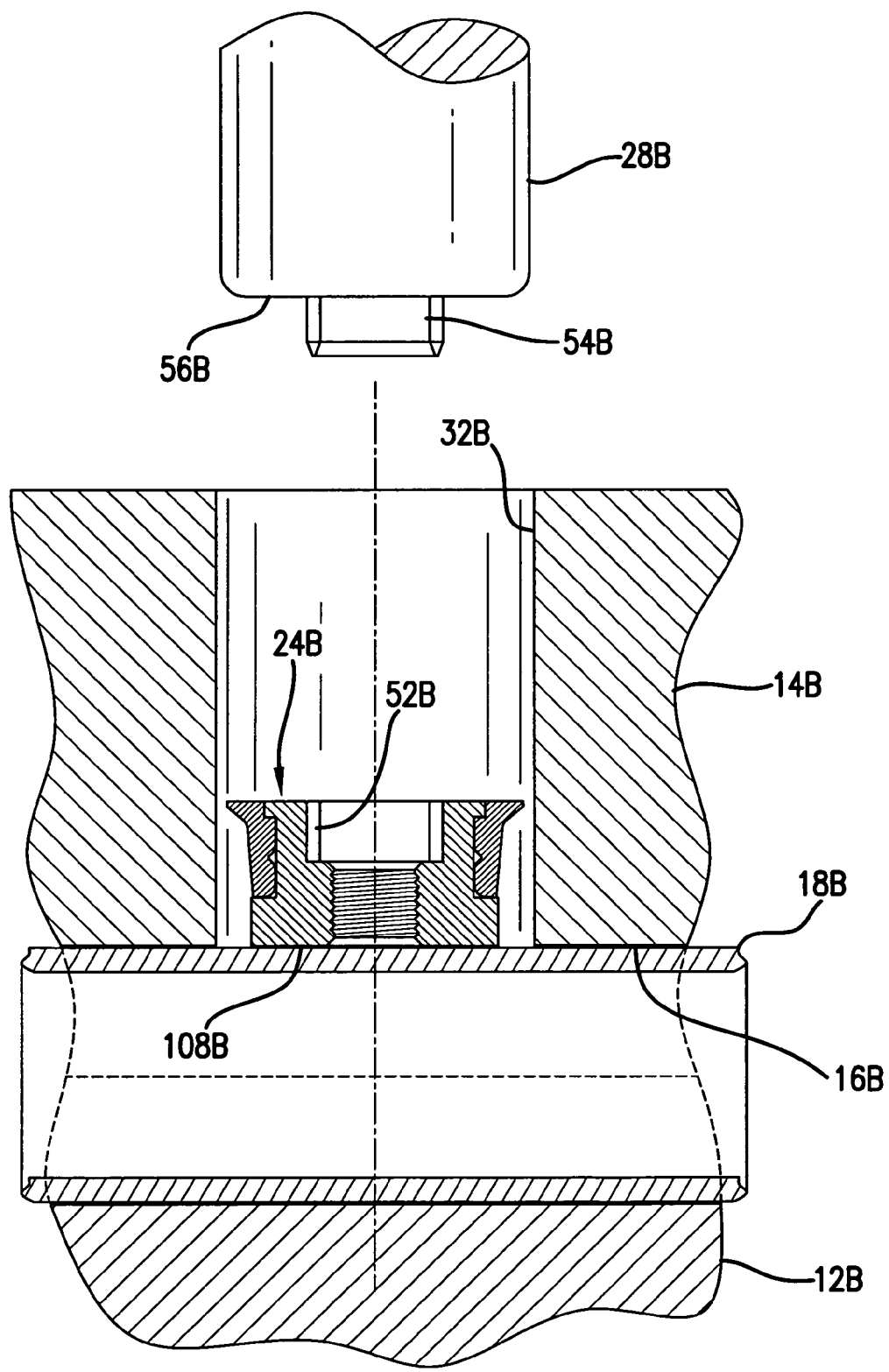
FIGS. 35-41 are similar to FIGS. 6-12 and 18-24, respectively, but showing the processing of the nut in FIG. 25.
Figure 36:
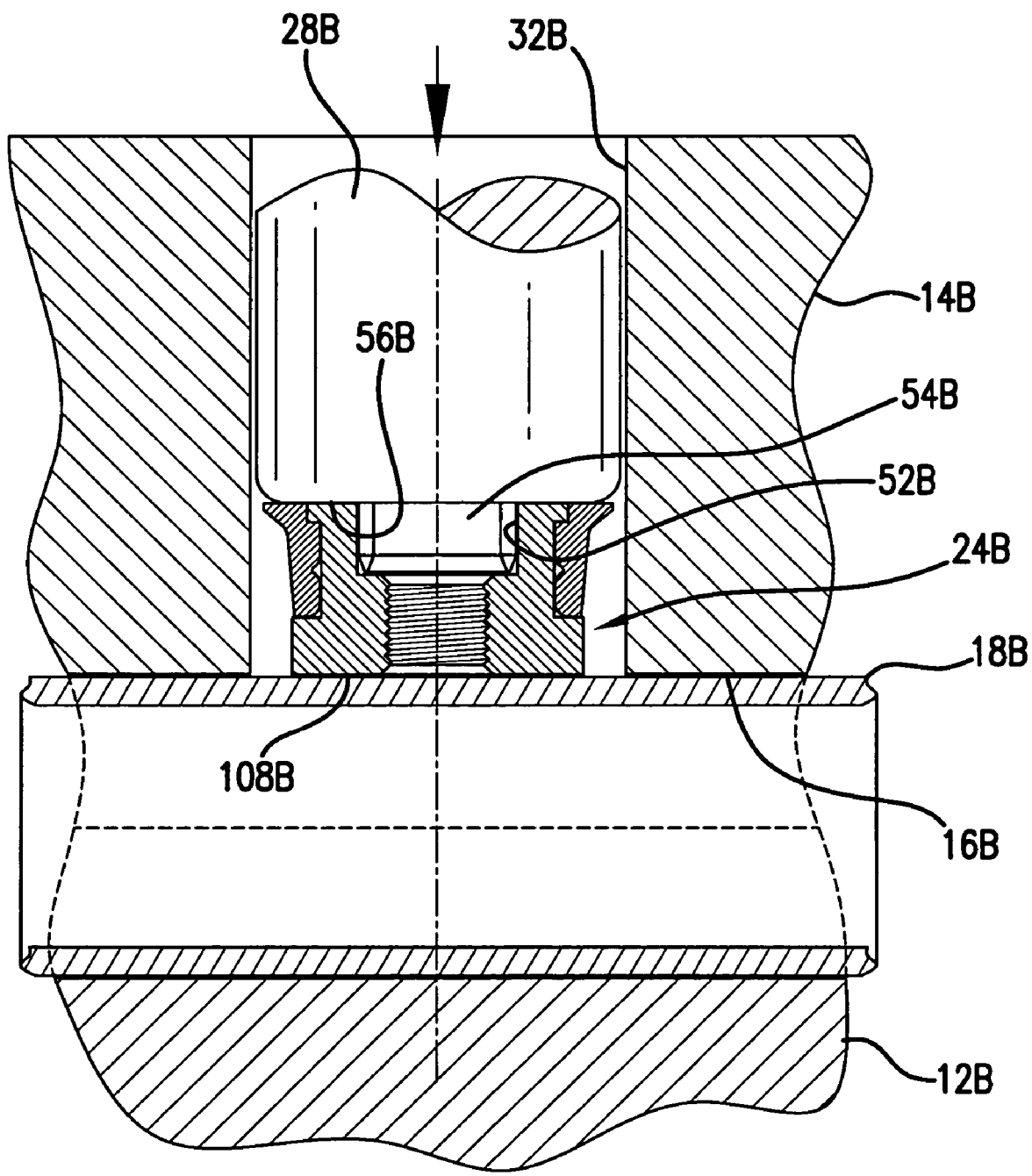

Describing now a typical sequence of operations in the insertion and fastening of the nut 24B and with reference to FIGS. 35-42, the power unit is operated like in the previous embodiments to position the output shaft 28B so that it is clear of the upper die passage 32B after the dies 12B and 14B have closed on a stock piece 18B and prior to the admission of the hydroforming fluid. See FIG. 35. The nut 24B is then inserted into the upper die passage 32B in a centered position against the stock piece 18B as also shown in FIG. 35. With the nut 24B thus inserted and centered, the power unit then extends its output shaft 28B to engage its drive end 54B in the nut body drive socket 52B and with its annular shoulder 56B hold the nut 24B firmly in place as shown in FIG. 36. Like previously described and as an alternative way to accomplishing such insertion and centering of the nut 24B, it will also be understood that the nut 24B can be received at its nut body socket 52B on the power unit output shaft drive end 54B while the output shaft is fully retracted and then temporarily held thereon with a suitable sticky substance such as grease while the output shaft is extended (lowered) to position the nut 24B against the stock piece 18B.

Figure 37:
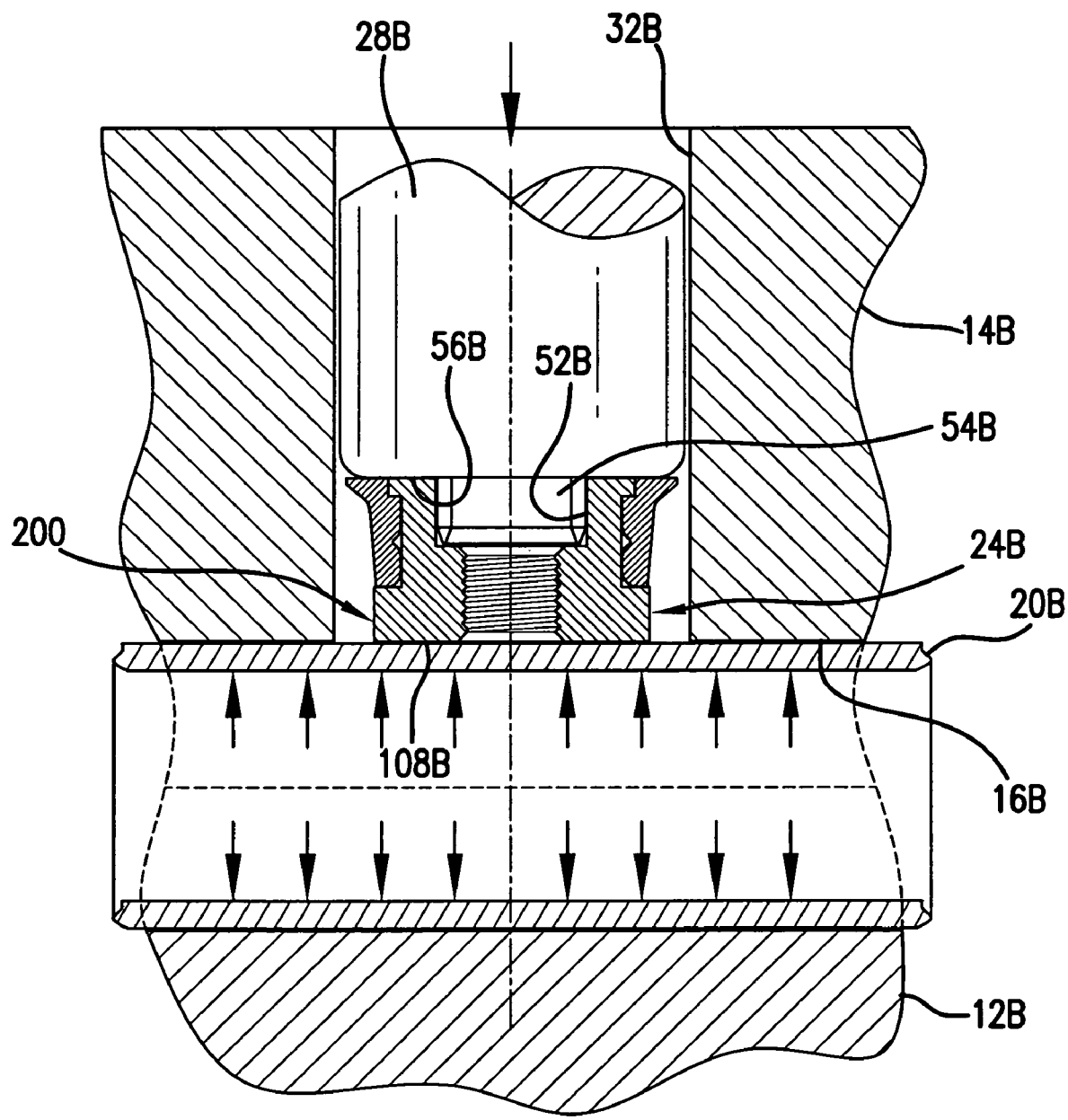

With the nut 24B thus held firmly in place by the output shaft 28B, the hydroforming fluid is then delivered under pressure to the interior of the stock piece 18B to form the piece against the die cavity surface to the required shape resulting in the hydroformed part 20B as shown in FIG. 37. Wherein the hexagonal-shaped flat punch face 108B of the nut body 200 supports the wall of the part inward of the upper die passage 32B against the hydraulic force that is generated to prevent rupturing of the part that could otherwise occur at this interruption in the die cavity surface.

Immediately following the hydroforming of the part 20B to the required shape and while the hydroforming pressure is maintained therein, the power unit further extends its output shaft 28B forcing the punch 36B to pierce a hexagonal-shaped hole in the part with the cutting edge 110B while the hexagonal-shaped slug 116B that results from this piercing operation and with the provision of the chamfer 112B remains integral with the retention collar 114B and is deflected inwardly and clear of the pierced hole by the nut as the piercing and collar forming portion of the nut proceeds into the part. See FIG. 38.

Like in the previous embodiments, the hydroforming pressure provides internal support of the wall of the part in an annular region immediately outward of the upper die passage 32B to enable such piercing and also inward wall forming action about the pierced hole by the hexagonal-shaped punch 36B and then the trailing locking ring 202 that is being carried along therewith by the nut body 200. Wherein by the cooperative action of the punch 36B and the trailing body 214 of the locking ring 202, there is formed the inwardly projecting retention collar 114B in the hydroformed part that extends about the nut 24B.

In this case, like with the embodiment in FIGS. 1-12, the shoulder 56 of the shaft 28B by its engagement with the outer end of the nut 24B prevents fluid in the part from escaping out through the threaded hole in the nut during the piercing operation and subsequent collar forming operation. While the nut 24B by the contact of its punch portion 106B and its locking ring 202 with the part prevents fluid in the part from escaping outward around the nut during the piercing operation and subsequent collar forming operation and wherein the locking ring 202 at the end of the collar forming operation is then forcibly held in surface-to-surface sealing contact with the retention collar 114B.

Figure 38:
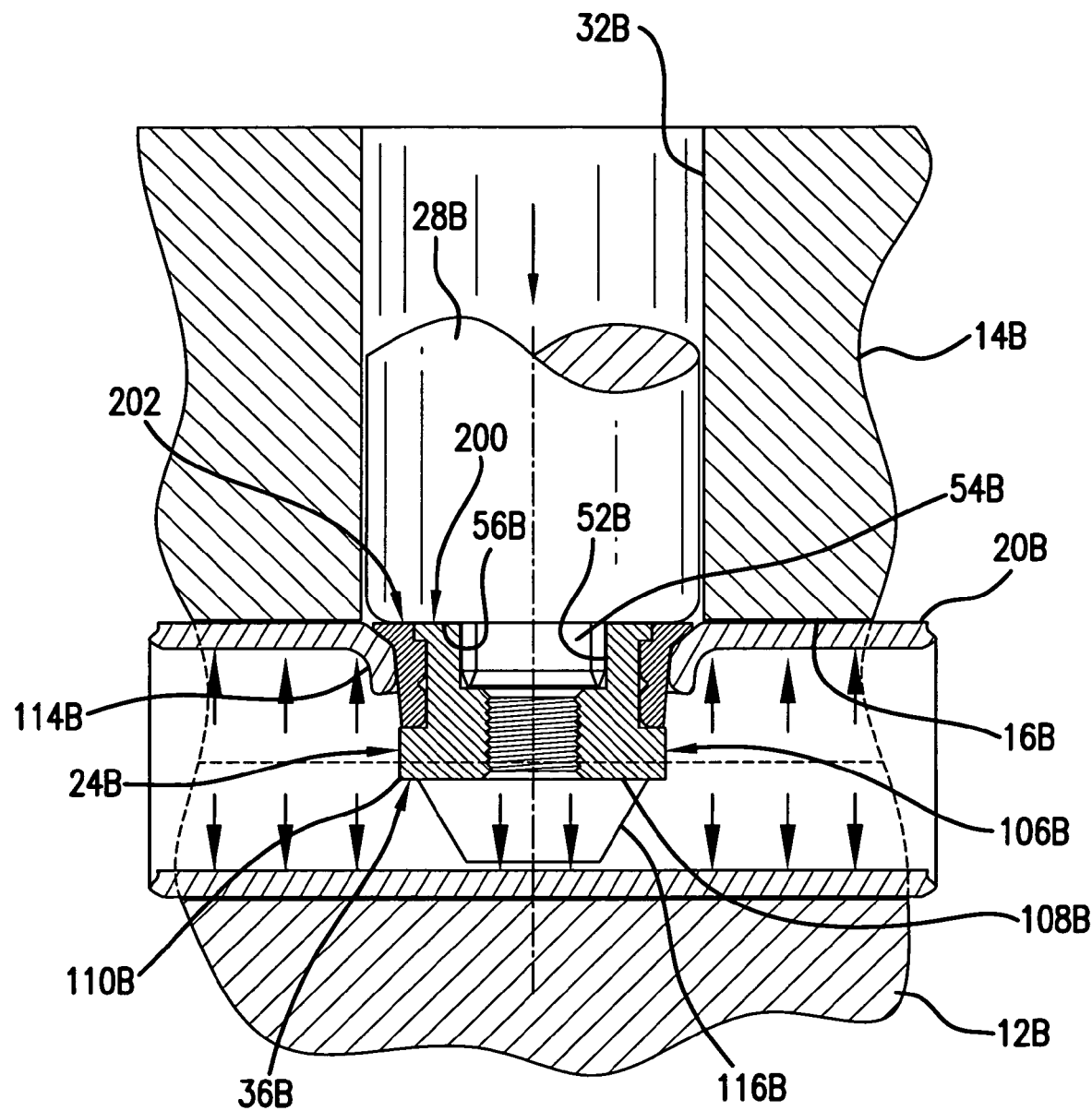

In the above piercing and retention collar forming operations with the nut 24B, the nut is inserted a sufficient distance into the hydroformed part by the power unit so that the hexagonal-shaped punch 36B that is a part of the nut body 200 and after having pierced and formed the retention collar 114B is then clear of the retention collar. Wherein the fingers 218 of the locking ring 202 that is carried by the nut body 200 are then closely received by and positioned within the retention collar 114B and the locking ring is thereby prevented from turning and wherein the ends of the fingers with such locking ring positioning then extend a substantial distance inwardly past the distal edge of the retention collar as shown in FIG. 38.

Figure 39:
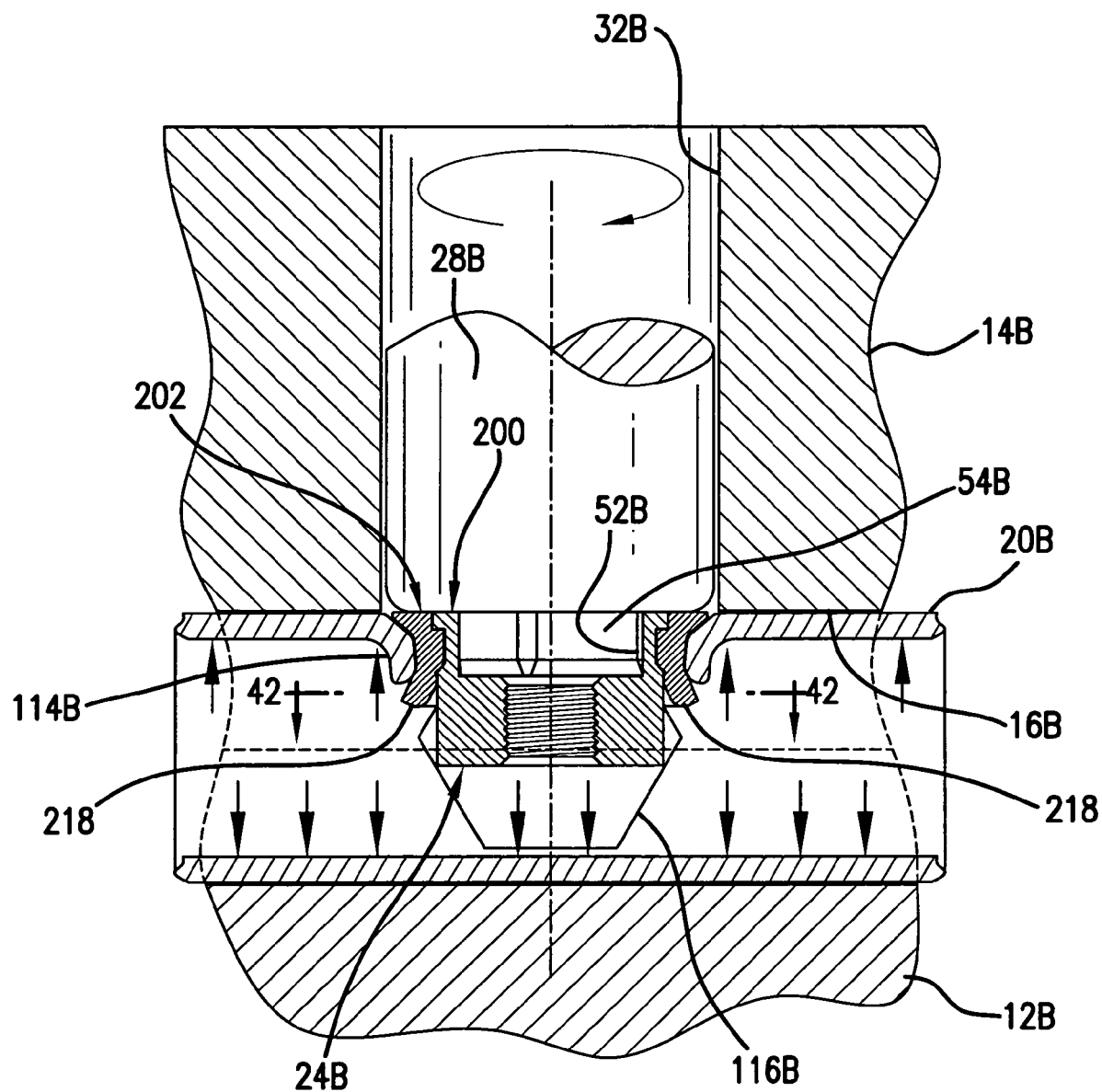
Figure 42:
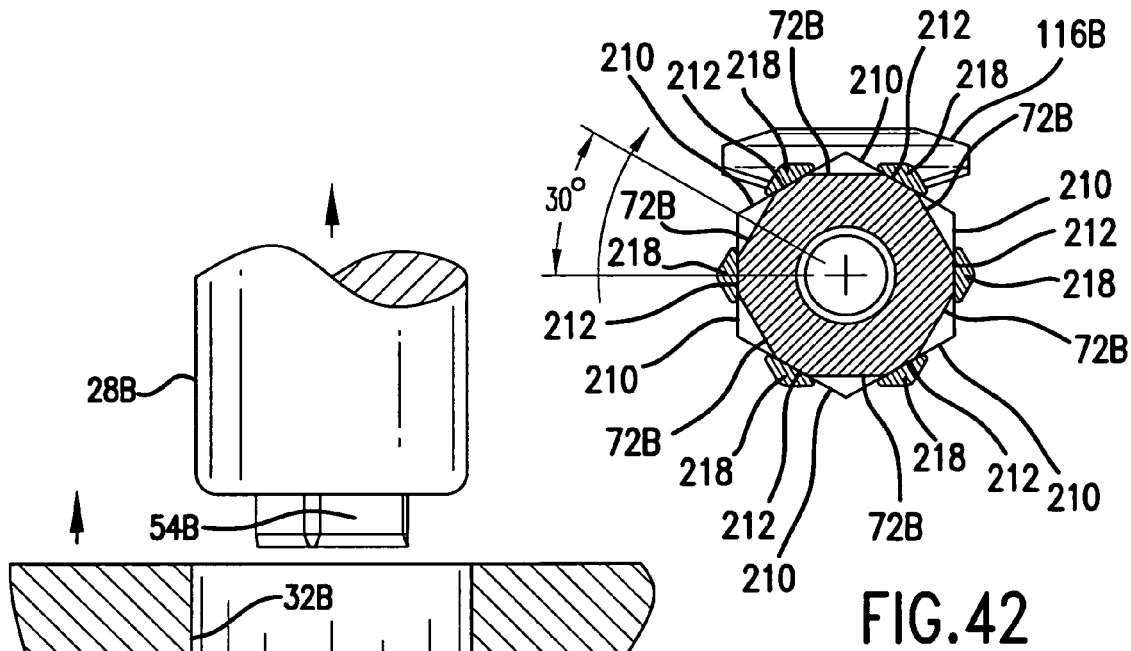
FIG. 42 is a view taken along the line 42-42 in FIG. 39 when looking in the direction of the arrows.

The power unit, while continuing to hold the nut 24B in place, then turns the output shaft 28B and thereby the nut body 200 of the nut 24B less than a complete revolution and in this illustrative example only 30 angular degrees as shown in FIGS. 39 and 42. Wherein with such partial turning of the nut body 200 relative to the stationary locking ring 202, the locking ring fingers 218 and thereby directly associated distal end portions of the retention collar 114B are caused to bend radially outward and into locked engagement by action of the ramp surfaces 210 of the cam 208 on the nut body 200 forcibly deflecting the fingers 218 of the locking ring radially outward from their recessed locations on the nut body and onto the relatively elevated flat crests 212 of the cam 208. With this occurring either while the hydroforming fluid remains under pressure in the part as shown in FIG. 39 or is then exhausted since the only force required after the piercing and retention collar forming operations is that force necessary to turn the nut body 200 to effect the locking operation.

Figure 40:
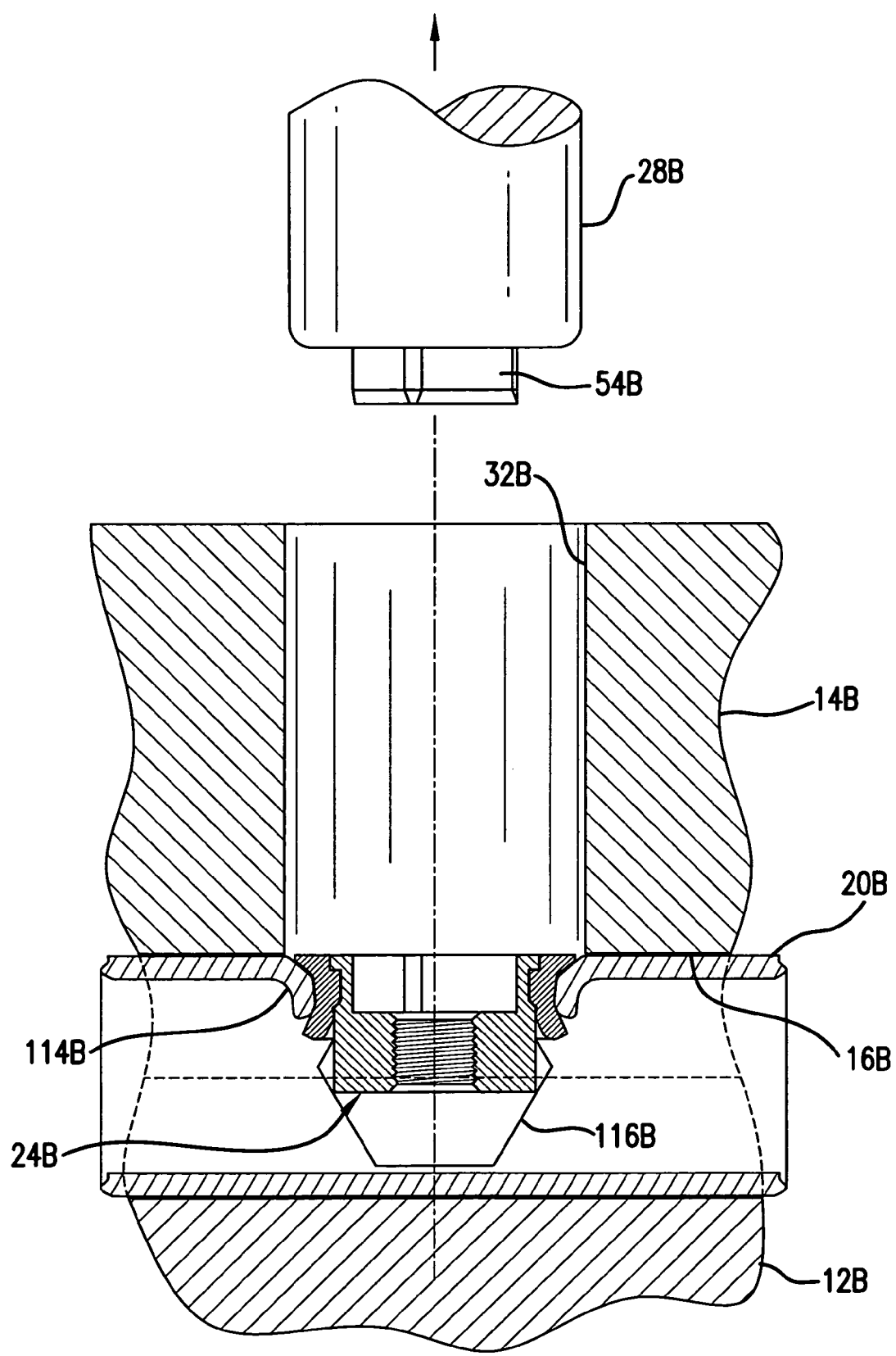
Figure 41:
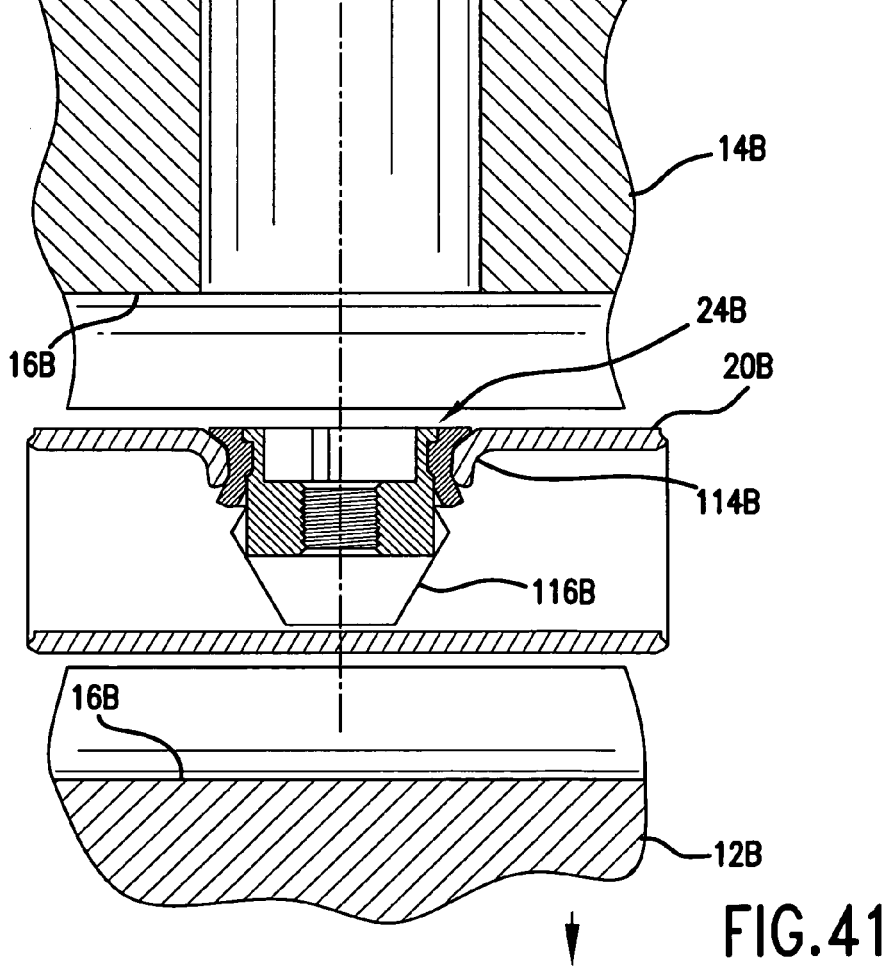

Following the locking of the assembly nut 24B to the hydroformed part 20B and referring to FIG. 40, the power unit then retracts the output shaft 28B to remove the output shaft drive end 54B from the nut body socket 52B while the hydroforming fluid is exhausted from the part if it has not been already. With the hydroformed part 20B exhausted of fluid, the dies 12B and 14B are then opened as shown in FIG. 41 to permit removal of the hydroformed part in preparation for the insertion of another stock pierce in the dies and commencement of another like nut insertion and fastening process with respect to this new piece. Wherein the power unit output shaft 28B is returned to its starting position shown in FIG. 35 following the closing of the dies 12B and 14B on the next piece of tubular stock that is to be hydroformed and have a like nut then inserted and mechanically locked thereto in like manner immediately following the hydroforming of the stock piece.

In each of the above exemplary embodiments, a single insertion and fastening of an attachable fastener nut is shown and described and it will be understood that where the hydroformed part is required to have more than one such fastening means and at different locations, this can be accomplished simultaneously in like manner at each required attaching location by employing a corresponding number of power unit installations in the hydroforming apparatus at the respective attaching locations for inserting and fastening an attachable nut at each of these locations. Furthermore, it will be understood that while the fastener nut is in each illustrative embodiment positioned and held against the stock piece prior to the hydroforming operation, this assumes that the wall of the stock piece is then against die cavity surface at this location. On the other hand, if the wall of the stock piece is not and is instead located at a distance from the die cavity surface at the required fastening location, it will be understood that the fastener nut to be inserted and attached is then temporarily held on the end of the output shaft as before described. So that the output shaft can then position and hold the punch end of the nut flush with the surrounding die cavity surface during the subsequent hydroforming of the stock piece wherein the wall of the part is then formed outwardly into contact with the thus positioned punch end of the fastener nut. It will also be understood that the load or fastening capacity of the nut is selected to best meet the requires of a particular application and that in the case where the hydroformed part requires multiple fastening means with different load capacities, the size or fastening capacity of each nut is selected that is best suited at each required attaching location.

Furthermore, it will be understood that with this invention disclosure, various modifications are likely to occur to those skilled in this art as well as others and therefore it is intended that the invention be to be limited only by the scope of the appended claims.

The invention claimed is:

1. A method for attaching a nut to the wall of a tubular part formed within a die cavity of a hydroforming die comprising:
   providing a nut having a nut body including a cylindrical body portion with a punch face at one end and an integral flange portion extending radially outward from the other end,
   positioning the nut within the die with the punch face engaging with the wall of the tubular part;
   extending an output shaft to drive the nut into the die cavity so that the punch face of the nut pierces a hole through the wall of tubular part to form a sleeve surrounding the cylindrical body portion and the flange portion of the nut forms a depressed wall portion in the wall to seat the flange portion upon the wall;
   after extending the output shaft to pierce the hole and form the sleeve and the depressed wall portion, then rotating the output shaft at speed and duration to cause heat buildup between the nut and the wall to weld the nut to the wall;
   after rotating the output shaft to weld the nut to the wall, then retracting the output shaft;
   and removing the tubular part from the die cavity.

2. The method of claim 1 further comprising the nut being driven into the die cavity to an extent that the depressed wall portion has a depth to recess the flange portion of the nut to a flush fit with the wall of the tubular part.

3. The method of claim 1 further comprising the nut body and the punch face being circular cylindrical in shape to form a circular collar and the rotating of the output shaft rotates the nut to cause heat build up between the nut and wall sufficient to weld the nut to the tubular part when the rotation is ceased.

4. The method claim 3 further comprising the output shaft being provided with a drive end portion that engages in a socket provided in the nut so that the nut is driven to rotate by the rotation of the output shaft.

5. The method of claim 1 further comprising the punch face having a non-circular shape to form a non-circular hole in the wall of the tubular part so that the nut body is fixed against rotation relative the tubular part, and the rotating of the output shaft against the non-rotating nut causes heat build-up between the non-rotating nut and the wall sufficient to weld the nut to the tubular part.

6. The method of claim 5 further comprising the output shaft carrying a ceramic disk that engages with the nut body so that upon rotation of the output shaft the ceramic disk causes friction heating of the non-rotating nut and the heat is in turn conducted into the wall of the tubular part to create the weld between the nut and the wall of the tubular part.

* * * * *